United States Patent
Hong et al.

(10) Patent No.: US 9,477,076 B2
(45) Date of Patent: Oct. 25, 2016

(54) EMS DEVICE HAVING FLEXIBLE SUPPORT POSTS

(71) Applicant: QUALCOMM MEMS Technologies, Inc., San Diego, CA (US)

(72) Inventors: John Hyunchul Hong, San Clemente, CA (US); Jian Jim Ma, Carlsbad, CA (US); Bing Wen, Poway, CA (US); Tallis Young Chang, San Diego, CA (US); Edward Keat Leem Chan, San Diego, CA (US); Brandon John Hong, San Clemente, CA (US); Kristopher Andrew Lavery, Pleasanton, CA (US); Yaoling Pan, San Diego, CA (US); Cheonhong Kim, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 14/564,851

(22) Filed: Dec. 9, 2014

(65) Prior Publication Data

US 2015/0277099 A1    Oct. 1, 2015

Related U.S. Application Data

(60) Provisional application No. 61/971,744, filed on Mar. 28, 2014.

(51) Int. Cl.
*G02B 26/00* (2006.01)
*G06T 1/20* (2006.01)
(Continued)

(52) U.S. Cl.
CPC ............. *G02B 26/001* (2013.01); *G06T 1/20* (2013.01); *G09G 3/2003* (2013.01); *G09G 3/346* (2013.01); *G09G 3/3466* (2013.01); *G09G 5/003* (2013.01)

(58) Field of Classification Search
None
See application file for complete search history.

(56) References Cited

U.S. PATENT DOCUMENTS

| 7,023,606 B2 | 4/2006 | Huibers |
| 7,071,520 B2 | 7/2006 | Reid |

(Continued)

FOREIGN PATENT DOCUMENTS

| DE | 10 2005 024 921 A1 | 11/2006 |
| DE | 10 2009 021 936 A1 | 11/2010 |

(Continued)

OTHER PUBLICATIONS

U.S. Office Action dated Feb. 25, 2016, issued in U.S. Appl. No. 14/564,846.

(Continued)

*Primary Examiner* — Khaja Ahmad
(74) *Attorney, Agent, or Firm* — Weaver Austin Villeneuve & Sampson LLP

(57) ABSTRACT

This disclosure provides apparatus, systems and methods for an electromechanical systems (EMS) device having one or more flexible support posts. In one aspect, the EMS device includes a substrate, a stationary electrode over the substrate, one or more flexible support posts over the substrate, and a movable electrode over the stationary electrode and supported by the one or more flexible support posts. The movable electrode is configured to move across a gap between the movable electrode and the stationary electrode upon electrostatic actuation, where the one or more flexible support posts include a first organic material and can be configured to compress to permit the movable electrode to move across the gap.

21 Claims, 20 Drawing Sheets

(51) Int. Cl.
*G09G 5/00* (2006.01)
*G09G 3/34* (2006.01)
*G09G 3/20* (2006.01)

(56) References Cited

U.S. PATENT DOCUMENTS

| | | | |
|---|---|---|---|
| 7,566,582 B2 | 7/2009 | Tapalian et al. | |
| 7,630,109 B2 | 12/2009 | Phillips et al. | |
| 7,679,812 B2 | 3/2010 | Sasagawa et al. | |
| 2006/0132030 A1* | 6/2006 | Gao | H01L 51/5237 313/511 |
| 2007/0090483 A1 | 4/2007 | Tapalian et al. | |
| 2007/0242358 A1 | 10/2007 | Lin et al. | |
| 2008/0157235 A1* | 7/2008 | Rogers | H01L 21/8258 257/415 |
| 2009/0034055 A1* | 2/2009 | Gibson | G02F 1/133516 359/296 |
| 2010/0149722 A1 | 6/2010 | Floyd | |
| 2011/0075245 A1 | 3/2011 | Hashimura et al. | |
| 2011/0193770 A1 | 8/2011 | Gaily et al. | |
| 2011/0249315 A1 | 10/2011 | Tao et al. | |
| 2012/0249558 A1* | 10/2012 | Lee | B81B 7/0006 345/501 |
| 2012/0327092 A1* | 12/2012 | Sasagawa | B81B 7/0058 345/501 |
| 2013/0128338 A1 | 5/2013 | Lin et al. | |
| 2013/0135338 A1 | 5/2013 | Gille et al. | |
| 2015/0277097 A1 | 10/2015 | Hong et al. | |
| 2015/0277098 A1 | 10/2015 | Hong et al. | |

FOREIGN PATENT DOCUMENTS

| | | |
|---|---|---|
| WO | WO 2014/150269 A1 | 9/2014 |
| WO | WO 2015/148107 A1 | 10/2015 |
| WO | WO 2015/148108 A1 | 10/2015 |
| WO | WO 2015/148110 A1 | 10/2015 |

OTHER PUBLICATIONS

PCT Invitation to Pay Additional Fees and, Where Applicable, Protest Fee dated Jun. 10, 2015, issued in PCT/US2015/019676.
PCT International Search Report and Written Opinion dated Aug. 12, 2015, issued in PCT/US2015/019676.
PCT Invitation to Pay Additional Fees and, Where Applicable, Protest Fee dated Jun. 23, 2015, issued in PCT/US2015/019678.
PCT International Search Report and Written Opinion dated Oct. 12, 2015, issued in PCT/US2015/019678.
PCT Invitation to Pay Additional Fees and, Where Applicable, Protest Fee dated Jun. 11, 2015, issued in PCT/US2015/019725.
PCT International Search Report and Written Opinion dated Aug. 27, 2015, issued in PCT/US2015/019725.

* cited by examiner

RED

GREEN

BLUE

BLACK

WHITE

EMS DEVICE HAVING FLEXIBLE SUPPORT POSTS

PRIORITY DATA

This patent document claims priority to and commonly assigned U.S. Provisional Patent Application No. 61/971,744, titled "Flexible EMS Device Using Organic Materials", by Hong et al., filed on Mar. 28, 2014, which is hereby incorporated by reference in its entirety and for all purposes.

TECHNICAL FIELD

This disclosure relates to electromechanical systems and devices, and more particularly to electromechanical systems and devices made of organic materials.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities.

Some IMODs are bi-stable IMODs, meaning that they can be configured in only two positions, e.g., open or closed. A single image pixel may include three or more bi-stable IMODs, each of which corresponds to a subpixel. However, IMODs are not only limited to bi-stable IMODS, but can include IMODs configured to move to three or more positions. Such IMODs may be referred to as analog IMODs (A-IMODs) or multi-state IMODs (MS-IMODs). Some A-IMODs may be positioned in a substantially continuous manner between a large number of gap heights, whereas MS-IMODs may generally be positioned in a smaller number of gap heights. As a result, an A-IMOD may be considered as a special case of the class of MS-IMODs—that is, as an MS-IMOD with a very large number of controllable gap heights. Accordingly, A-IMODs and MS-IMODs may both be referred to herein as MS-IMODs, or simply as IMODs. In a display device that includes MS-IMODs or A-IMODs, a pixel's reflective color may be determined by the gap spacing or "gap height" between an absorber stack and a reflector stack of a single IMOD.

SUMMARY

The systems, methods and devices of this disclosure each have several innovative aspects, no single one of which is solely responsible for the desirable attributes disclosed herein.

One innovative aspect of the subject matter described in this disclosure can be implemented in an electromechanical systems apparatus. The electromechanical systems apparatus can include a substrate, a stationary electrode over the substrate, and a movable electrode over the stationary electrode and configured to move across a gap between the movable electrode and the stationary electrode by electrostatic actuation. The electromechanical systems apparatus can further include one or more organic layers over the substrate, where at least a first portion of the one or more organic layers is between the movable electrode and the stationary electrode and at least a second portion of the one or more organic layers includes an optical layer configured to attenuate energy of light corresponding to one or more wavelength ranges.

In some implementations, the first portion of the one or more organic layers between the movable electrode and the stationary electrode can include a mechanical layer. In some implementations, the movable electrode can include a reflective layer over the mechanical layer. In some implementations, the optical layer can be positioned over the reflective layer. In some implementations, the first portion of the one or more organic layers between the movable electrode and the stationary electrode can include one or more support posts. In some implementations, the apparatus can further include an absorber over the movable electrode. In some implementations, the apparatus can further include a substantially transparent polymer superstrate over the movable electrode. In some implementations, the optical layer includes a plurality of particles, where the particles have an average diameter between about 5 nm and about 500 nm. The particles can include at least one of an oxide, a fluoride, and a metal. In some implementations, the optical layer can be configured to attenuate a wavelength range corresponding to green colors.

Another innovative aspect of the subject matter described in this disclosure can be implemented in a method of manufacturing an electromechanical systems apparatus. The method includes providing a substrate, forming a stationary electrode over the substrate, forming a movable electrode over the stationary electrode, and forming one or more organic layers over the substrate. The movable electrode can be configured to move across a gap between the movable electrode and the stationary electrode by electrostatic actuation. At least a first portion of the one or more organic layers is between the movable electrode and the stationary electrode, and at least a second portion of the one or more organic layers includes an optical layer configured to attenuate energy of light corresponding to one or more wavelength ranges.

In some implementations, forming the one or more organic layers includes forming the one or more organic layers with an additive processing technique. In some implementations, the method further includes forming the gap between the movable electrode and the stationary electrode, where forming the gap includes removing a sacrificial layer using an orthogonal solvent. In some implementations, the first portion of the one or more organic layers between the movable electrode and the stationary electrode includes a mechanical layer and one or more support posts. In some implementations, the optical layer includes a plurality of particles, where the particles have an average diameter between about 5 nm and about 500 nm.

Another innovative aspect of the subject matter described in this disclosure can be implemented in an electromechanical systems apparatus. The apparatus includes a substrate, a stationary electrode over the substrate, a dielectric layer over the stationary electrode, and an absorber over the dielectric layer, where the absorber includes an electrically insulating material. The apparatus further includes a movable electrode over the absorber, where the movable electrode is configured to move to a plurality of positions between the absorber and the movable electrode to define a plurality of gap heights.

In some implementations, the absorber includes an optical layer, where the optical layer includes a plurality of particles in the electrically insulating material and having an average diameter between about 5 nm and about 500 nm. The particles may include a metal coated with a dielectric coating. In some implementations, the absorber can include a first absorber layer including at least two regions separated laterally by a space across an absorber plane, a dielectric film covering the first absorber layer and substantially filling the space, and a second absorber layer over the dielectric film and above the space between the at least two regions of the first absorber layer. In some implementations, the absorber is part of an absorber stack that includes an absorbing layer and an optical layer over the absorbing layer, where the optical layer is configured to attenuate energy of light corresponding to one or more wavelength ranges.

Another innovative aspect of the subject matter described in this disclosure can be implemented in an electromechanical systems apparatus. The apparatus includes a substrate that is substantially transparent, a first electrode that is substantially transparent and over the substrate, a first dielectric layer over the first electrode, and an absorber over the first electrode, where the absorber is configured to at least partially absorb visible light. The apparatus further includes a movable electrode over the absorber and configured to move across a gap between the movable electrode and the absorber by electrostatic actuation between the movable electrode and the first electrode.

In some implementations, the absorber can include an optical layer, where the optical layer includes a plurality of particles having an average diameter between about 5 nm and about 500 nm. The particles may be coated with a dielectric coating having a thickness between about 1 nm and about 10 nm. In some implementations, the distance across the gap is between about 15% and about 45% of a distance between the movable electrode and the first electrode when the movable electrode is in an unactuated position.

Another innovative aspect of the subject matter described in this disclosure can be implemented in a method of manufacturing an electromechanical systems apparatus. The method includes providing a substrate, forming a stationary electrode over the substrate, forming a dielectric layer over the stationary electrode, forming an absorber over the substrate where the absorber includes an electrically insulating material, and forming a movable electrode over the absorber. The movable electrode is configured to move to a plurality of positions between the absorber and the movable electrode to define a plurality of gap heights.

In some implementations, the absorber can include an optical layer, where the optical layer includes a plurality of particles in the electrically insulating material and having an average diameter between about 5 nm and about 500 nm. In some implementations, forming the absorber can include forming an absorbing layer over the dielectric layer, and forming an optical layer over the absorbing layer, where the optical layer is configured to attenuate energy of light corresponding to one or more wavelength ranges.

Another innovative aspect of the subject matter described in this disclosure can be implemented in an electromechanical systems apparatus. The apparatus includes a substrate, a stationary electrode over the substrate, one or more flexible support posts over the substrate, and a movable electrode over the stationary electrode and supported by the one or more flexible support posts. The movable electrode is configured to move across a gap between the movable electrode and the stationary electrode upon electrostatic actuation, and the one or more flexible support posts include a first organic material and are configured to compress to permit the movable electrode to move across the gap.

In some implementations, the apparatus further includes an optical layer including a second organic material over the substrate, the optical layer configured to attenuate energy of light corresponding to one or more wavelength ranges. In some implementations, the one or more flexible support posts are made of an elastomeric material. The elastomeric material can include at least one of polydimethylsiloxane (PDMS) and polyurethane. In some implementations, the one or more flexible support posts include a flexible support post attached to the movable electrode proximate a center of a surface of the movable electrode. In some implementations, the EMS apparatus forms a display, the display comprising: an IMOD formed on the substrate, the IMOD including the stationary electrode, the movable electrode where the movable electrode includes a reflective layer, the one or more flexible support posts, and an absorber over the movable electrode and spaced apart from the reflective layer.

Another innovative aspect of the subject matter described in this disclosure can be implemented in a method of manufacturing an electromechanical systems apparatus. The method includes providing a substrate, forming a stationary electrode over the substrate, forming one or more flexible support posts over the substrate, and forming a movable electrode over the stationary electrode and supported by the one or more flexible support posts. The movable electrode is configured to move across a gap between the movable electrode and the stationary electrode by electrostatic actuation, where the one or more flexible support posts include a first organic material and configured to permit the movable electrode to move across the gap.

In some implementations, the one or more flexible support posts are made of an elastomeric material. In some implementations, the elastomeric material includes at least one of PDMS and polyurethane. In some implementations, forming the one or more flexible support posts includes depositing a photoresist layer over the substrate, patterning the photoresist layer to expose a portion of the substrate, depositing a solution of the first organic material over the exposed portion of the substrate, and curing the first organic material to solidify the first organic material.

Details of one or more implementations of the subject matter described in this specification are set forth in the accompanying drawings and the description below. Although the examples provided in this summary are primarily described in terms of electromechanical systems (EMS) based displays, the concepts provided herein may apply to other types of displays, such as liquid crystal displays (LCDs), organic light-emitting diode (OLED) displays, electrophoretic displays, and field emission displays, as well as to other non-display EMS devices, such as EMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
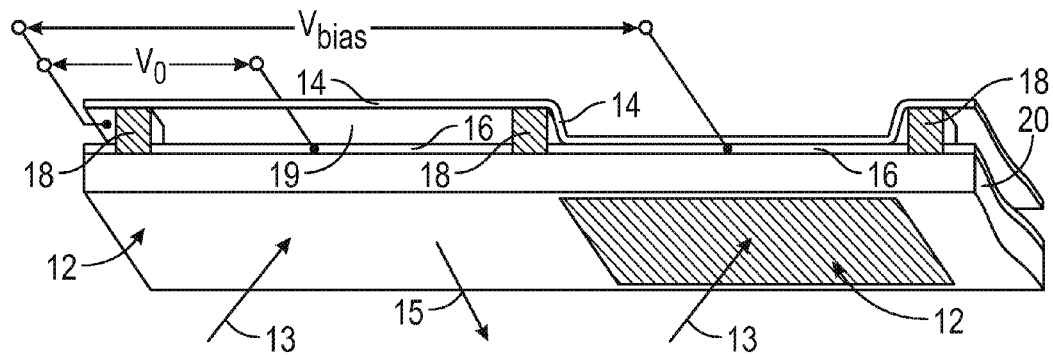
FIG. 1 shows an isometric view illustration depicting two adjacent example interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The disclosed implementations described herein relate to an EMS apparatus. In some implementations, the EMS apparatus can include multiple structures made of organic materials, including mechanical and optical structures. In some implementations, the EMS apparatus may be part of a display device. The use of organic materials can provide flexibility in devices that can bend or in which bending may be desired, such as flexible display devices. An example of an EMS apparatus in a display device can be an interferometric modulator (IMOD).

In some implementations, the EMS apparatus can include one or more layers made of organic materials. The EMS apparatus can include a substrate, a stationary electrode over the substrate, and a movable electrode over the stationary electrode and configured to move across a gap between the movable electrode and the stationary electrode. The movable electrode can include at least one of a mechanical layer, a reflective layer, and an optical layer, where the movable electrode can be supported by support hinges. In some implementations, the one or more layers made of organic materials can include at least the support hinges, the mechanical layer, and the optical layer. In some implementations, the optical layer can serve as an attenuator configured to attenuate energy of light corresponding to one or more wavelength ranges. The optical layer can include a plurality of particles, where the particles can include at least one of an oxide, a fluoride, and a metal.

In some implementations, irrespective of whether the EMS apparatus is made of one or more organic layers, the EMS apparatus can include an absorber having one or more layers that are electrically insulating or otherwise non-electrically active. In some implementations, the absorber can include an optical layer having a plurality of particles in an electrically insulating material. The particles can be configured to at least partially absorb light or attenuate energy of light corresponding to one or more wavelength ranges. In some implementations, the absorber can include a dielectric film in between at least two patterned absorber layers to reduce lateral charge mobility. Therefore, the absorber may not be part of an electrically active electrode in the EMS apparatus. In some implementations, the absorber may be separated from a stationary electrode in the EMS apparatus by a dielectric layer.

Particular implementations of the subject matter described in this disclosure can be implemented to realize one or more of the following potential advantages. One or more layers made of organic materials in an EMS apparatus can lead to several potential advantages. Whereas inorganic materials tend to be stiff and incompatible with structures requiring flexibility, the use of organic materials can provide elastomeric properties in structures that are desirably capable of bending and substantially restoring to its original shape. Structures having organic materials can be manufactured using additive processing, which may be cheaper and less complex than conventional semiconductor fabrication techniques, including photolithography. The structural integrity of the EMS apparatus may be improved because more additive processing steps may be used for depositing organic materials, and such additive processing steps avoid etching that can attack structural materials. Furthermore, the use of organic materials may ease processing in several ways. For example, some organic materials may be processed (e.g., cured) at relatively low temperatures. Organic materials may also enable more simple processing steps, such as lamination, for plugging release holes in the EMS apparatus. The use of organic materials may also improve design flexibility over the use of inorganic materials, including having more materials that provide a wider range of mechanical properties. In some implementations, an index-matched fluid can be used in a gap of the EMS apparatus to reduce actuation distance and reduce the required voltage to move the movable electrode. In some implementations, one of the organic layers can be a nanoparticle-loaded optical layer operable to tune optical characteristics of the EMS apparatus. For example, the nanoparticle-loaded optical layer may serve as an attenuator to provide an improved white state and good color saturation in the EMS apparatus.

In some implementations, the nanoparticle-loaded optical layer may be part of an EMS apparatus that does not include organic layers, and may serve as an attenuator to provide an improved white state and good color saturation. In fact, the nanoparticle-loaded optical layer may be part of an absorber configured to strongly absorb one or more wavelengths of light, where the absorber does not serve as an electrically active electrode. In some implementations, the nanoparticle-loaded optical layer may be substituted with or added to a patterned multi-layer absorber that reduces lateral charge mobility so that the absorber does not serve as an electrically active electrode. Hence, the absorber may be separated from a stationary electrode to provide increased separation between electrodes in the EMS apparatus. This can reduce the effects of snap-through and reduce tilt instability, thereby providing additional stable regions of operation.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 µm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
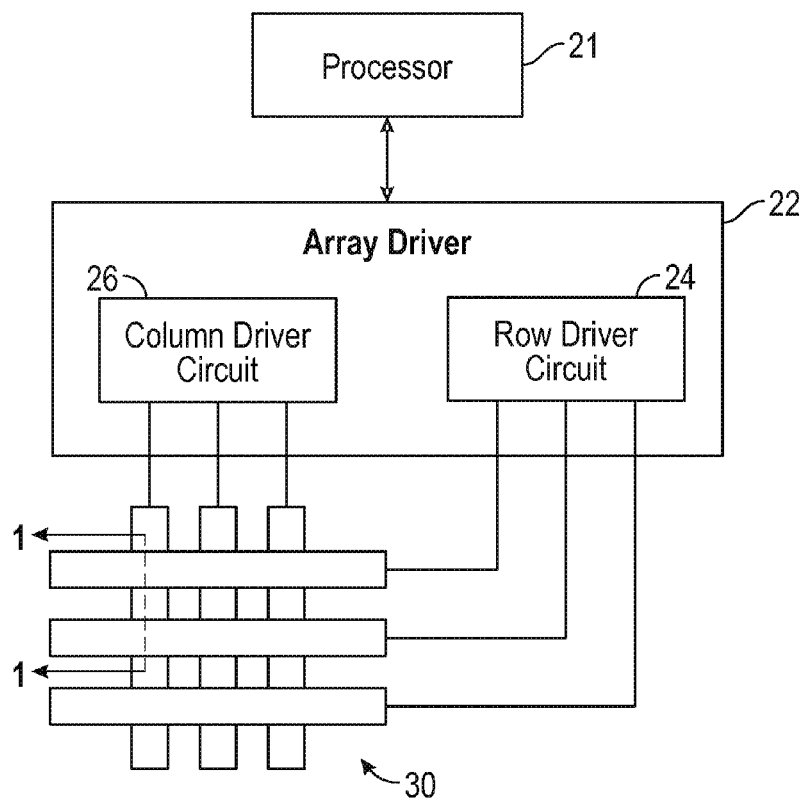
FIG. 2 shows a system block diagram illustrating an example electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

Figure 3A:
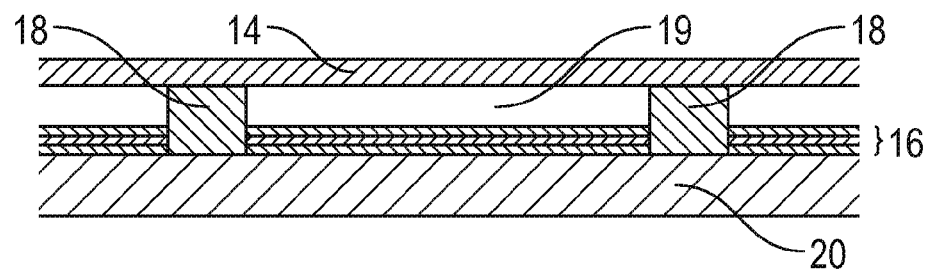
FIGS. 3A-3E show cross-sectional illustrations of varying implementations of IMOD display elements.
Figure 3B:
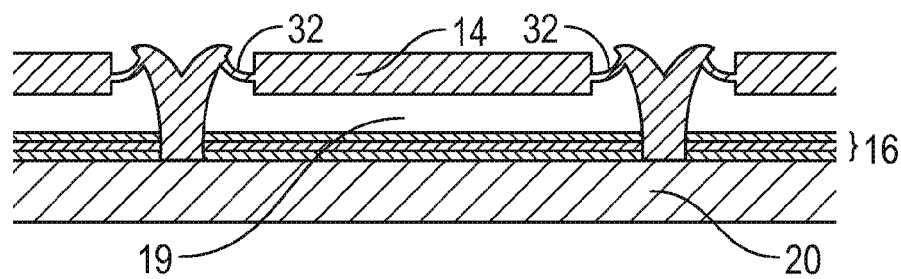
Figure 3C:
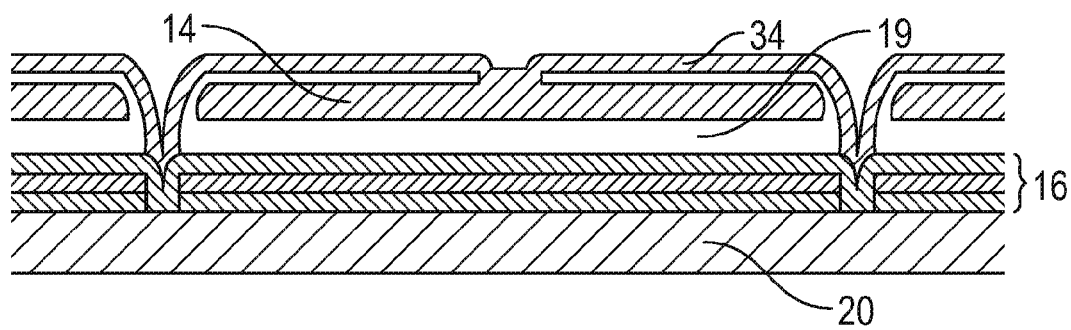

The details of the structure of IMOD displays and display elements may vary widely. FIGS. 3A-3E are cross-sectional illustrations of varying implementations of IMOD display elements. FIG. 3A is a cross-sectional illustration of an IMOD display element, where a strip of metal material is deposited on supports 18 extending generally orthogonally from the substrate 20 forming the movable reflective layer 14. In FIG. 3B, the movable reflective layer 14 of each IMOD display element is generally square or rectangular in shape and attached to supports at or near the corners, on tethers 32. In FIG. 3C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as implementations of "integrated" supports or support posts 18. The implementation shown in FIG. 3C has additional benefits deriving from the decoupling of the optical functions of the movable reflective layer 14 from its mechanical functions, the latter of which are carried out by the deformable layer 34. This decoupling allows the structural design and materials used for the movable reflective layer 14 and those used for the deformable layer 34 to be optimized independently of one another.

Figure 3D:
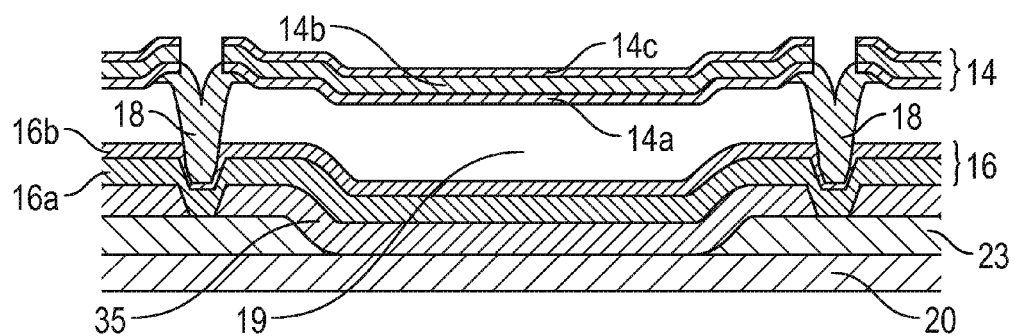

FIG. 3D is another cross-sectional illustration of an IMOD display element, where the movable reflective layer 14 includes a reflective sub-layer 14a. The movable reflective layer 14 rests on a support structure, such as support posts 18. The support posts 18 provide separation of the movable reflective layer 14 from the lower stationary electrode, which can be part of the optical stack 16 in the illustrated IMOD display element. For example, a gap 19 is formed between the movable reflective layer 14 and the optical stack 16, when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, for example, an aluminum (Al) alloy with about 0.5% copper (Cu), or another reflective metallic material. Employing conductive layers 14a and 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 3D, some implementations also can include a black mask structure 23, or dark film layers. The black mask structure 23 can be formed in optically inactive regions (such as between display elements or under the support posts 18) to absorb ambient or stray light. The black mask structure 23 also can improve the optical properties of a display device by inhibiting light from being reflected from or transmitted through inactive portions of the display, thereby increasing the contrast ratio. Additionally, at least some portions of the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. In some implementations, the black mask structure 23 can be an etalon or interferometric stack structure. For example, in some implementations, the interferometric stack black mask structure 23 includes a molybdenum-chromium (MoCr) layer that serves as an optical absorber, an $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, tetrafluoromethane (or carbon tetrafluoride, $CF_4$) and/or oxygen ($O_2$) for the MoCr and $SiO_2$ layers and chlorine ($Cl_2$) and/or boron trichloride ($BCl_3$) for the aluminum alloy layer. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate electrodes (or conductors) in the optical stack 16 (such as the absorber layer 16a) from the conductive layers in the black mask structure 23.

Figure 3E:
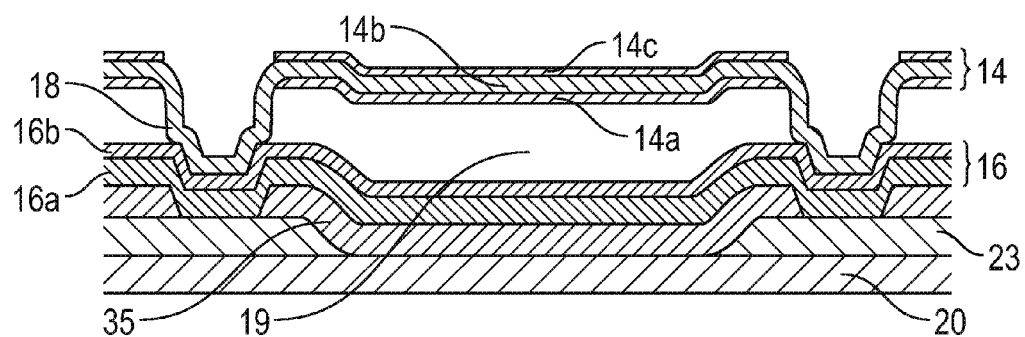

FIG. 3E is another cross-sectional illustration of an IMOD display element, where the movable reflective layer 14 is self-supporting. While FIG. 3D illustrates support posts 18 that are structurally and/or materially distinct from the movable reflective layer 14, the implementation of FIG. 3E includes support posts that are integrated with the movable reflective layer 14. In such an implementation, the movable reflective layer 14 contacts the underlying optical stack 16 at multiple locations, and the curvature of the movable reflective layer 14 provides sufficient support that the movable reflective layer 14 returns to the unactuated position of FIG. 3E when the voltage across the IMOD display element is insufficient to cause actuation. In this way, the portion of the movable reflective layer 14 that curves or bends down to contact the substrate or optical stack 16 may be considered an "integrated" support post. One implementation of the optical stack 16, which may contain a plurality of several different layers, is shown here for clarity including an optical absorber 16a, and a dielectric 16b. In some implementations, the optical absorber 16a may serve both as a stationary electrode and as a partially reflective layer. In some implementations, the optical absorber 16a can be an order of magnitude thinner than the movable reflective layer 14. In some implementations, the optical absorber 16a is thinner than the reflective sub-layer 14a.

In implementations such as those shown in FIGS. 3A-3E, the IMOD display elements form a part of a direct-view device, in which images can be viewed from the front side of the transparent substrate 20, which in this example is the side opposite to that upon which the IMOD display elements are formed. In these implementations, the back portions of the device (that is, any portion of the display device behind the movable reflective layer 14, including, for example, the deformable layer 34 illustrated in FIG. 3C) can be configured and operated without impacting or negatively affecting the image quality of the display device, because the reflective layer 14 optically shields those portions of the device. For example, in some implementations a bus structure (not illustrated) can be included behind the movable reflective layer 14 that provides the ability to separate the optical properties of the modulator from the electromechanical properties of the modulator, such as voltage addressing and the movements that result from such addressing.

Figure 4:
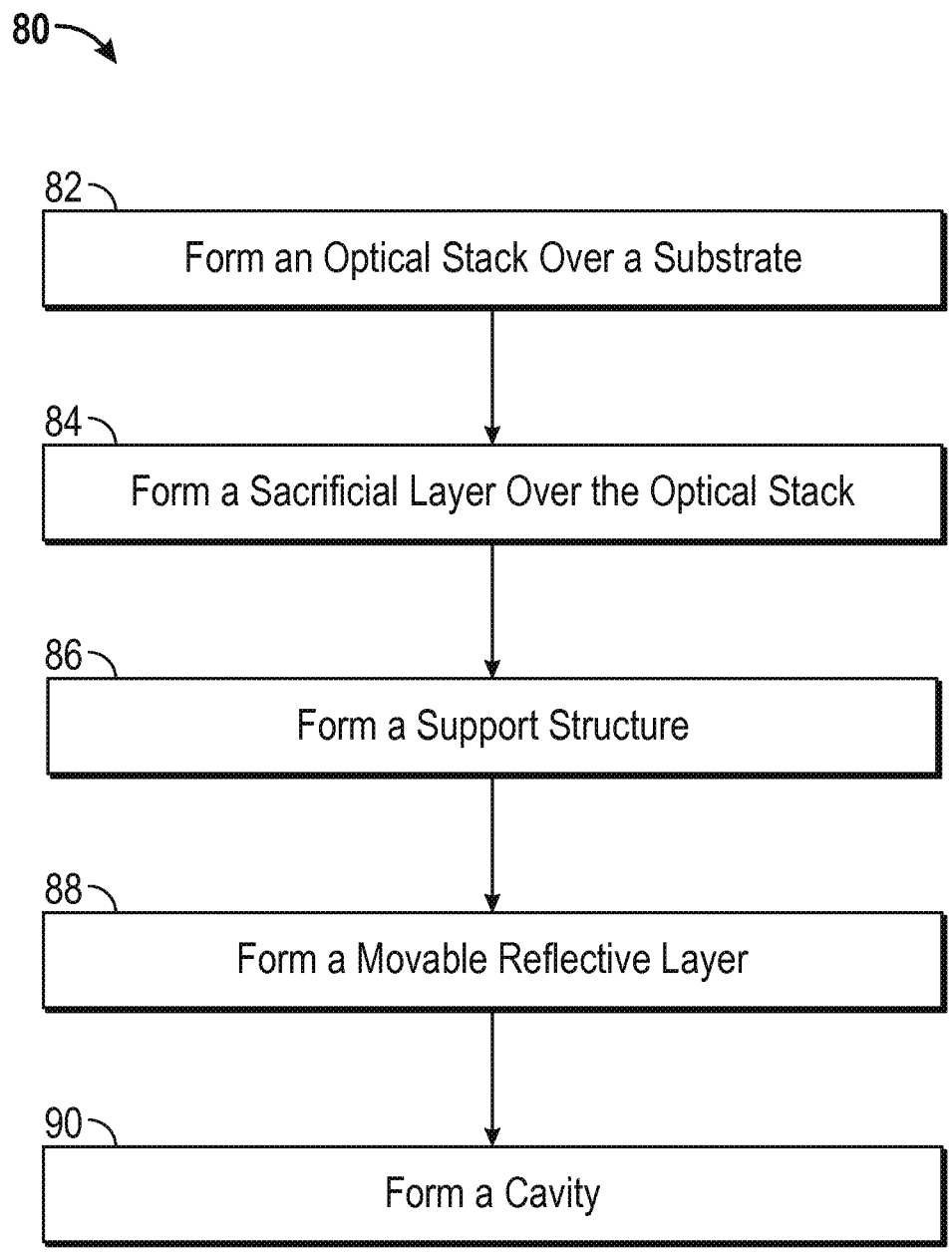
FIG. 4 shows a flow diagram illustrating an example manufacturing process for an IMOD display or display element.
Figure 5A:
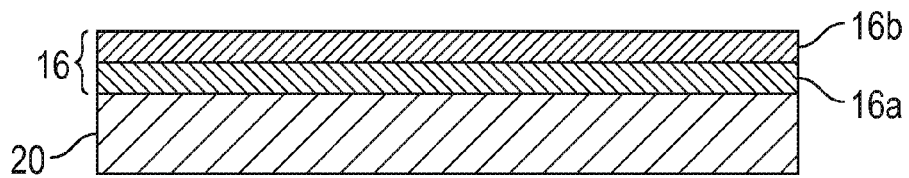
FIGS. 5A-5E show cross-sectional illustrations of various stages in an example process of making an IMOD display or display element.

FIG. 4 is a flow diagram illustrating a manufacturing process 80 for an IMOD display or display element. FIGS. 5A-5E are cross-sectional illustrations of various stages in the manufacturing process 80 for making an IMOD display or display element. In some implementations, the manufacturing process 80 can be implemented to manufacture one or more EMS devices, such as IMOD displays or display elements. The manufacture of such an EMS device also can include other blocks not shown in FIG. 4. The process 80 begins at block 82 with the formation of the optical stack 16 over the substrate 20. FIG. 5A illustrates such an optical stack 16 formed over the substrate 20. The substrate 20 may be a transparent substrate such as glass or plastic such as the materials discussed above with respect to FIG. 1. The substrate 20 may be flexible or relatively stiff and unbending, and may have been subjected to prior preparation processes, such as cleaning, to facilitate efficient formation of the optical stack 16. As discussed above, the optical stack 16 can be electrically conductive, partially transparent, partially reflective, and partially absorptive, and may be fabricated, for example, by depositing one or more layers having the desired properties onto the transparent substrate 20.

In FIG. 5A, the optical stack 16 includes a multilayer structure having sub-layers 16a and 16b, although more or fewer sub-layers may be included in some other implementations. In some implementations, one of the sub-layers 16a and 16b can be configured with both optically absorptive and electrically conductive properties, such as the combined conductor/absorber sub-layer 16a. In some implementations, one of the sub-layers 16a and 16b can include molybdenum-chromium (molychrome or MoCr), or other materials with a suitable complex refractive index. Additionally, one or more of the sub-layers 16a and 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, such as an upper sub-layer 16b that is deposited over one or more underlying metal and/or oxide layers (such as one or more reflective and/or conductive layers). In addition, the optical stack 16 can be patterned into individual and parallel strips that form the rows of the display. In some implementations, at least one of the sub-layers of the optical stack, such as the optically absorptive layer, may be quite thin (e.g., relative to other layers depicted in this disclosure), even though the sub-layers 16a and 16b are shown somewhat thick in FIGS. 5A-5E.

Figure 5B:
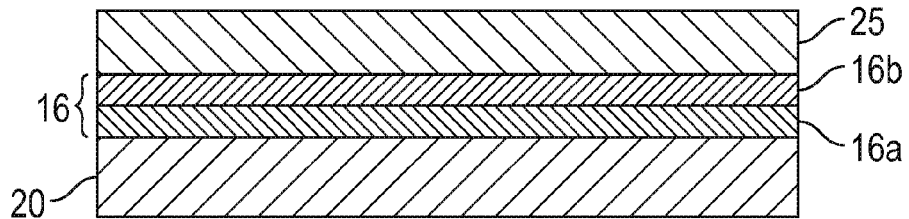

The process 80 continues at block 84 with the formation of a sacrificial layer 25 over the optical stack 16. Because the sacrificial layer 25 is later removed (see block 90) to form the cavity 19, the sacrificial layer 25 is not shown in the resulting IMOD display elements. FIG. 5B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIG. 5E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 5C:
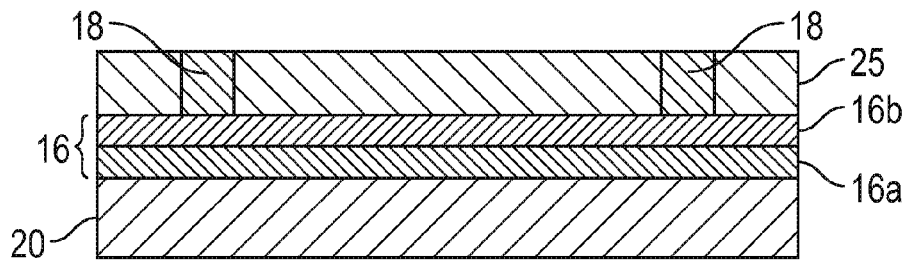

The process 80 continues at block 86 with the formation of a support structure such as a support post 18. The formation of the support post 18 may include patterning the sacrificial layer 25 to form a support structure aperture, then depositing a material (such as a polymer or an inorganic material, like silicon oxide) into the aperture to form the support post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the support post 18 contacts the substrate 20. Alternatively, as depicted in FIG. 5C, the aperture formed in the sacrificial layer 25 can extend through the sacrificial layer 25, but not through the optical stack 16. For example, FIG. 5E illustrates the lower ends of the support posts 18 in contact with an upper surface of the optical stack 16. The support post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 5C, but also can extend at least partially over a portion of the sacrificial layer 25. As noted above, the patterning of the sacrificial layer 25 and/or the support posts 18 can be performed by a masking and etching process, but also may be performed by alternative patterning methods.

Figure 5D:
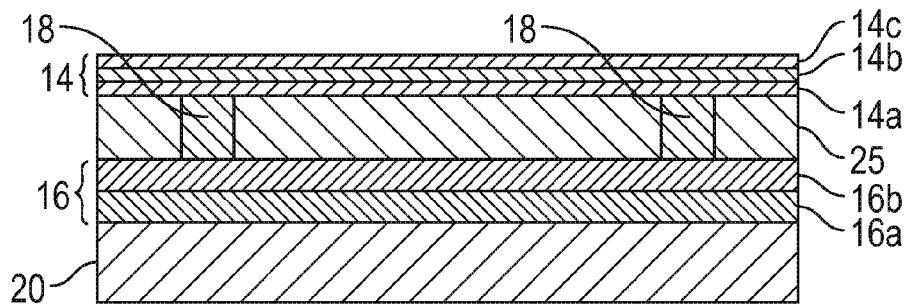
Figure 5E:
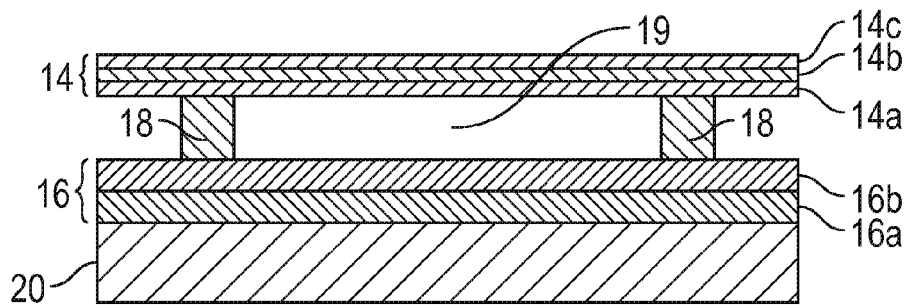

The process 80 continues at block 88 with the formation of a movable reflective layer or membrane such as the movable reflective layer 14 illustrated in FIG. 5D. The movable reflective layer 14 may be formed by employing one or more deposition steps, including, for example, reflective layer (such as aluminum, aluminum alloy, or other reflective materials) deposition, along with one or more patterning, masking and/or etching steps. The movable reflective layer 14 can be patterned into individual and parallel strips that form, for example, the columns of the display. The movable reflective layer 14 can be electrically conductive, and referred to as an electrically conductive layer. In some implementations, the movable reflective layer 14 may include a plurality of sub-layers 14a, 14b and 14c as shown in FIG. 5D. In some implementations, one or more of the sub-layers, such as sub-layers 14a and 14c, may include highly reflective sub-layers selected for their optical properties, and another sub-layer 14b may include a mechanical sub-layer selected for its mechanical properties. In some implementations, the mechanical sub-layer may include a dielectric material. Since the sacrificial layer 25 is still present in the partially fabricated IMOD display element formed at block 88, the movable reflective layer 14 is typically not movable at this stage. A partially fabricated IMOD display element that contains a sacrificial layer 25 also may be referred to herein as an "unreleased" IMOD.

The process 80 continues at block 90 with the formation of a cavity 19. The cavity 19 may be formed by exposing the sacrificial material 25 (deposited at block 84) to an etchant. For example, an etchable sacrificial material such as Mo or amorphous Si may be removed by dry chemical etching by exposing the sacrificial layer 25 to a gaseous or vaporous etchant, such as vapors derived from solid $XeF_2$ for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD display element may be referred to herein as a "released" IMOD.

In some implementations, the packaging of an EMS component or device, such as an IMOD-based display, can include a backplate (alternatively referred to as a backplane, back glass or recessed glass) which can be configured to protect the EMS components from damage (such as from mechanical interference or potentially damaging substances). The backplate also can provide structural support for a wide range of components, including but not limited to driver circuitry, processors, memory, interconnect arrays, vapor barriers, product housing, and the like. In some implementations, the use of a backplate can facilitate integration of components and thereby reduce the volume, weight, and/or manufacturing costs of a portable electronic device.

Figure 6A:
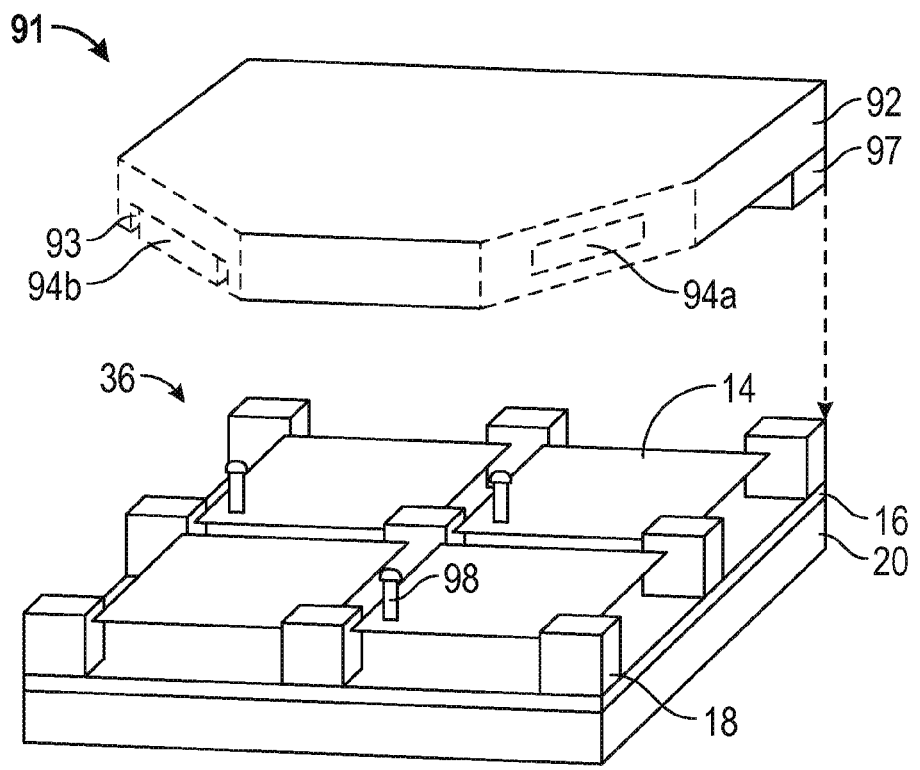
FIGS. 6A and 6B show schematic exploded partial perspective views of a portion of an electromechanical systems (EMS) package including an array of EMS elements and a backplate.
Figure 6B:
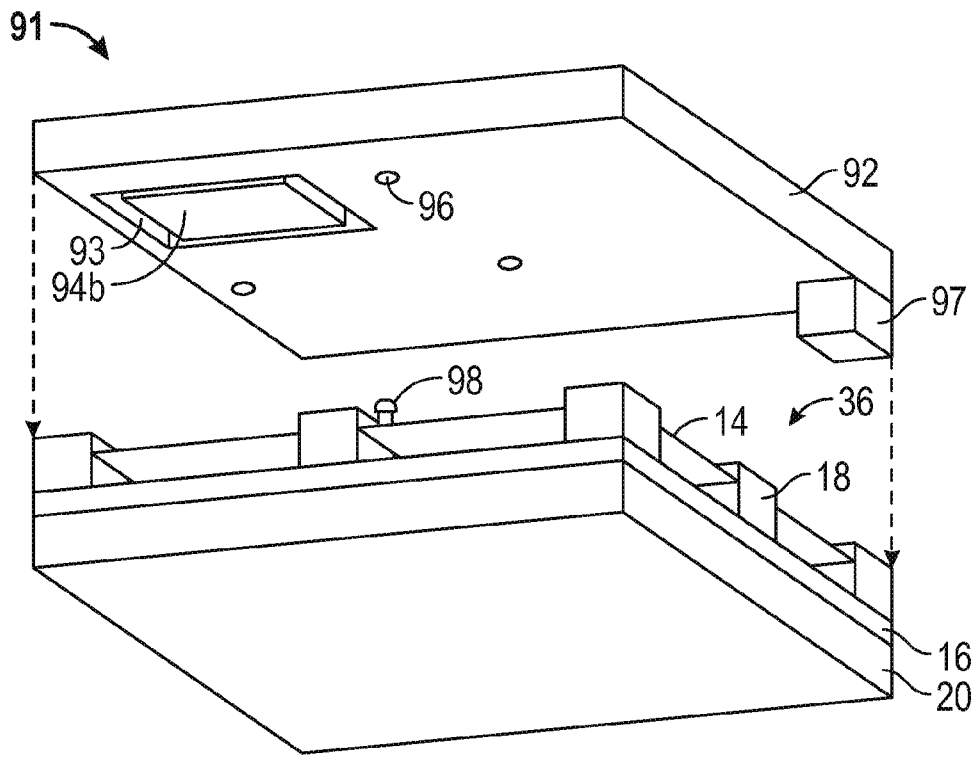

FIGS. 6A and 6B are schematic exploded partial perspective views of a portion of an EMS package 91 including an array 36 of EMS elements and a backplate 92. FIG. 6A is shown with two corners of the backplate 92 cut away to better illustrate certain portions of the backplate 92, while FIG. 6B is shown without the corners cut away. The EMS array 36 can include a substrate 20, support posts 18, and a movable layer 14. In some implementations, the EMS array 36 can include an array of IMOD display elements with one or more optical stack portions 16 on a transparent substrate, and the movable layer 14 can be implemented as a movable reflective layer.

The backplate 92 can be essentially planar or can have at least one contoured surface (e.g., the backplate 92 can be formed with recesses and/or protrusions). The backplate 92 may be made of any suitable material, whether transparent or opaque, conductive or insulating. Suitable materials for the backplate 92 include, but are not limited to, glass, plastic, ceramics, polymers, laminates, metals, metal foils, Kovar and plated Kovar.

As shown in FIGS. 6A and 6B, the backplate 92 can include one or more backplate components 94a and 94b, which can be partially or wholly embedded in the backplate 92. As can be seen in FIG. 6A, backplate component 94a is embedded in the backplate 92. As can be seen in FIGS. 6A and 6B, backplate component 94b is disposed within a recess 93 formed in a surface of the backplate 92. In some implementations, the backplate components 94a and/or 94b can protrude from a surface of the backplate 92. Although backplate component 94b is disposed on the side of the backplate 92 facing the substrate 20, in other implementations, the backplate components can be disposed on the opposite side of the backplate 92.

The backplate components 94a and/or 94b can include one or more active or passive electrical components, such as transistors, capacitors, inductors, resistors, diodes, switches, and/or integrated circuits (ICs) such as a packaged, standard or discrete IC. Other examples of backplate components that can be used in various implementations include antennas, batteries, and sensors such as electrical, touch, optical, or chemical sensors, or thin-film deposited devices.

In some implementations, the backplate components 94a and/or 94b can be in electrical communication with portions of the EMS array 36. Conductive structures such as traces, bumps, posts, or vias may be formed on one or both of the backplate 92 or the substrate 20 and may contact one another or other conductive components to form electrical connections between the EMS array 36 and the backplate components 94a and/or 94b. For example, FIG. 6B includes one or more conductive vias 96 on the backplate 92 which can be aligned with electrical contacts 98 extending upward from the movable layers 14 within the EMS array 36. In some implementations, the backplate 92 also can include one or more insulating layers that electrically insulate the backplate components 94a and/or 94b from other components of the EMS array 36. In some implementations in which the backplate 92 is formed from vapor-permeable materials, an interior surface of backplate 92 can be coated with a vapor barrier (not shown).

The backplate components 94a and 94b can include one or more desiccants which act to absorb any moisture that may enter the EMS package 91. In some implementations, a desiccant (or other moisture absorbing materials, such as a getter) may be provided separately from any other backplate components, for example as a sheet that is mounted to the backplate 92 (or in a recess formed therein) with adhesive. Alternatively, the desiccant may be integrated into the backplate 92. In some other implementations, the desiccant may be applied directly or indirectly over other backplate components, for example by spray-coating, screen printing, or any other suitable method.

In some implementations, the EMS array 36 and/or the backplate 92 can include mechanical standoffs 97 to maintain a distance between the backplate components and the display elements and thereby prevent mechanical interference between those components. In the implementation illustrated in FIGS. 6A and 6B, the mechanical standoffs 97 are formed as posts protruding from the backplate 92 in alignment with the support posts 18 of the EMS array 36. Alternatively or in addition, mechanical standoffs, such as rails or posts, can be provided along the edges of the EMS package 91.

Although not illustrated in FIGS. 6A and 6B, a seal can be provided which partially or completely encircles the EMS array 36. Together with the backplate 92 and the substrate 20, the seal can form a protective cavity enclosing the EMS array 36. The seal may be a semi-hermetic seal, such as a conventional epoxy-based adhesive. In some other implementations, the seal may be a hermetic seal, such as a thin film metal weld or a glass frit. In some other implementations, the seal may include polyisobutylene (PIB), polyurethane, liquid spin-on glass, solder, polymers, plastics, or other materials. In some implementations, a reinforced sealant can be used to form mechanical standoffs.

In alternate implementations, a seal ring may include an extension of either one or both of the backplate 92 or the substrate 20. For example, the seal ring may include a mechanical extension (not shown) of the backplate 92. In some implementations, the seal ring may include a separate member, such as an O-ring or other annular member.

In some implementations, the EMS array 36 and the backplate 92 are separately formed before being attached or coupled together. For example, the edge of the substrate 20 can be attached and sealed to the edge of the backplate 92 as discussed above. Alternatively, the EMS array 36 and the backplate 92 can be formed and joined together as the EMS package 91. In some other implementations, the EMS package 91 can be fabricated in any other suitable manner, such as by forming components of the backplate 92 over the EMS array 36 by deposition.

FIGS. 7A-7E show examples of how a multi-state IMOD (MS-IMOD) may be positioned to produce different colors. Analog IMODs (A-IMODs) and multi-state IMODs (MS-IMODs) described herein are considered to be examples of the broader class of MS-IMODs.

In an MS-IMOD, a pixel's reflective color may be varied by changing the gap height between an absorber stack and a reflector stack (also referred to as a mirror stack). In FIGS. 7A-7E, an MS-IMOD 700 includes a mirror stack 705 and an absorber stack 710. In this implementation, the absorber stack 710 is partially reflective and partially absorptive. Here, the mirror stack 705 includes at least one metallic reflective layer, which also may be referred to herein as a mirrored surface or a metal mirror.

In some implementations, an absorber layer of the absorber stack 710 may be formed of a partially absorptive and partially reflective layer. The absorber layer may be part of an absorber stack that includes other layers, such as one or more dielectric layers, an electrode layer, etc. According to some such implementations, the absorber stack 710 may include a dielectric layer, a metal layer and a passivation layer. In some implementations, the dielectric layer may be formed of silicon dioxide ($SiO_2$), silicon oxynitride (SiON), magnesium fluoride ($MgF_2$), aluminum oxide ($Al_2O_3$) and/or other dielectric materials. In some implementations, the metal layer may be formed of chromium (Cr) and/or molychrome (MoCr, a molybdenum-chromium alloy). In some implementations, the passivation layer may include $Al_2O_3$ or another dielectric material.

The mirrored surface of the mirror stack 705 may, for example, be formed of a reflective metal such as aluminum (Al), silver (Ag), etc. The mirrored surface may be part of a reflector stack that includes other layers, such as one or more dielectric layers. Such dielectric layers may be formed of titanium oxide ($TiO_2$), silicon nitride ($Si_3N_4$), zirconium oxide ($ZrO_2$), tantalum pentoxide ($Ta_2O_5$), antimony trioxide ($Sb_2O_3$), hafnium(IV) oxide ($HfO_2$), scandium(III) oxide ($Sc_2O_3$), indium(III) oxide ($In_2O_3$), tin-doped indium(III) oxide ($Sn:In_2O_3$), $SiO_2$, SiON, $MgF_2$, $Al_2O_3$, hafnium fluoride ($HfF_4$), ytterbium(III) fluoride ($YbF_3$), cryolite ($Na_3AlF_6$) and/or other dielectric materials.

In FIGS. 7A-7E, the mirror stack 705 is shown at five positions relative to the absorber stack 710. However, an MS-IMOD 700 may be movable between substantially more than 5 positions relative to the mirror stack 705. For example, some MS-IMODs may be positioned in 8 or more gap heights 730, 10 or more gap heights 730, 16 or more gap heights 730, 20 or more gap heights 730, 32 or more gap heights 730, etc. Some MS-IMODs also may be positioned with gap heights 730 that correspond to other colors, such as yellow, orange, violet, cyan and/or magenta. In some A-IMOD implementations, the gap height 730 between the mirror stack 705 and the absorber stack 710 may be varied in a substantially continuous manner. In some such MS-IMODs 700, the gap height 730 may be controlled with a high level of precision, e.g., with an error of 10 nm or less.

Although the absorber stack 710 includes a single absorber layer in this example, alternative implementations of the absorber stack 710 may include multiple absorber layers. Moreover, in alternative implementations, the absorber stack 710 may not be partially reflective.

An incident wave having a wavelength $\lambda$ will interfere with its own reflection from the mirror stack 705 to create a standing wave with local peaks and nulls. The first null is $\lambda/2$ from the mirror and subsequent nulls are located at $\lambda/2$ intervals. For that wavelength, a thin absorber layer placed at one of the null positions will absorb very little energy.

Figure 7A:
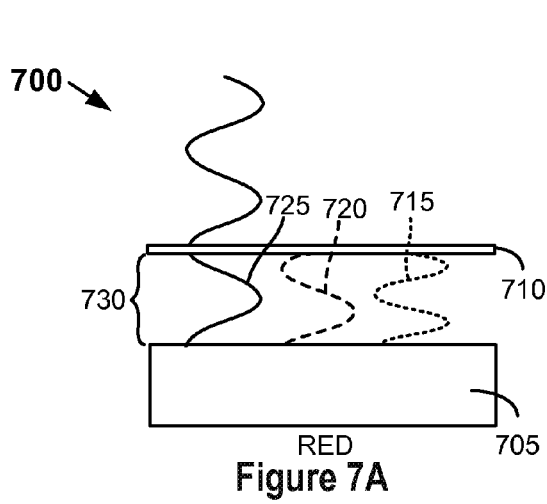
FIGS. 7A-7E show examples of how a multi-state IMOD (MS-IMOD) may be positioned to produce different colors.

Referring first to FIG. 7A, when the gap height 730 is substantially equal to the half wavelength of a red wavelength of light 725 (also referred to herein as a red color), the absorber stack 710 is positioned at the null of the red standing wave interference pattern. The absorption of the red wavelength of light 725 is near zero because there is almost no red light energy coincident at the absorber. Therefore, light having a wavelength substantially corresponding to the red wavelength of light 725 is reflected efficiently. Light of other colors, including the blue wavelength of light 715 and the green wavelength of light 720, has relatively high intensity values at the absorber stack 710. Instead, such light is substantially absorbed by the absorber stack 710.

Figure 7B:
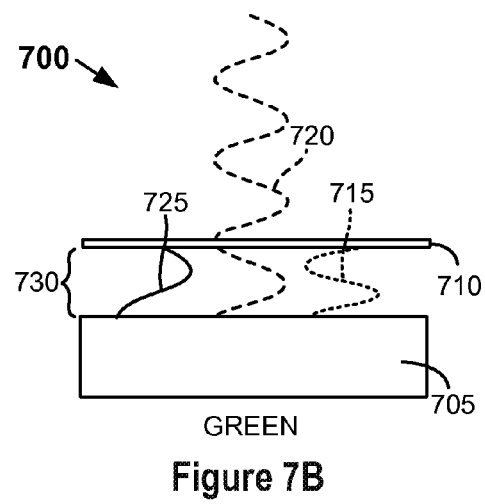

FIG. 7B depicts the MS-IMOD 700 in a configuration wherein the mirror stack 705 is moved closer to the absorber stack 710 (or vice versa). In this example, the gap height 730 is substantially equal to the half wavelength of the green wavelength of light 720. The absorber stack 710 is positioned at the null of the green standing wave interference pattern. The absorption of the green wavelength of light 720 is near zero because there is almost no green light at the absorber. At this configuration, constructive interference appears between green light reflected from the absorber stack 710 and green light reflected from the mirror stack 705. Light having a wavelength substantially corresponding to the green wavelength of light 720 is reflected efficiently. Light of other colors, including the red wavelength of light 725 and the blue wavelength of light 715, is substantially absorbed by the absorber stack 710.

Figure 7C:
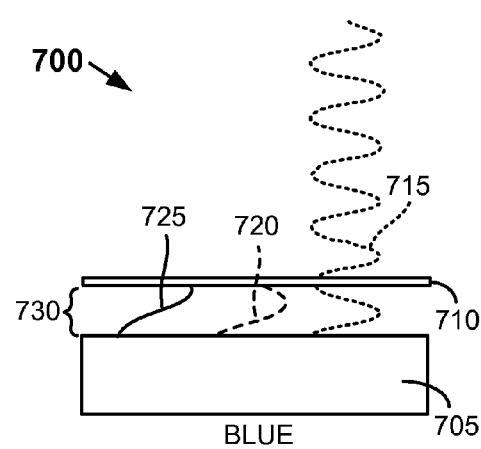

In FIG. 7C, the mirror stack 705 is moved closer to the absorber stack 710 (or vice versa), so that the gap height 730 is substantially equal to the half wavelength of the blue wavelength of light 715. Light having a wavelength substantially corresponding to the blue wavelength of light 715 is reflected efficiently. Light of other colors, including the red wavelength of light 725 and the green wavelength of light 720, is substantially absorbed by the absorber stack 710.

Figure 7D:
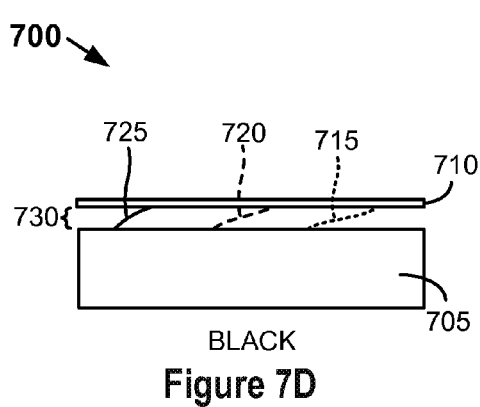

In FIG. 7D, however, the MS-IMOD 700 is in a configuration wherein the gap height 730 is substantially equal to ¼ of the wavelength of the average color in the visible range. In such arrangement, the absorber is located near the intensity peak of the interference standing wave; the strong absorption due to high field intensity together with destructive interference between the absorber stack 710 and the mirror stack 705 causes relatively little visible light to be reflected from the MS-IMOD 700. This configuration may be referred to herein as a "black state." In some such implementations, the gap height 730 may be made larger or smaller than shown in FIG. 7D, in order to reinforce other wavelengths that are outside the visible range. Accordingly, the configuration of the MS-IMOD 700 shown in FIG. 7D provides merely one example of a black state configuration of the MS-IMOD 700.

Figure 7E:
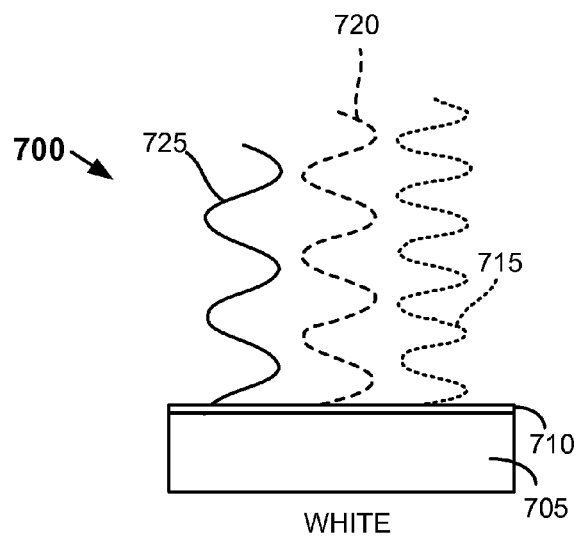

FIG. 7E depicts the MS-IMOD 700 in a configuration wherein the absorber stack 710 is in close proximity to the mirror stack 705. In this example, the gap height 730 is negligible because the absorber stack 710 is substantially adjacent to the mirror stack 705. Light having a broad range of wavelengths is reflected efficiently from the mirror stack 705 without being absorbed to a significant degree by the absorber stack 710. This configuration may be referred to herein as a "white state." However, in some implementations the absorber stack 710 and the mirror stack 705 may be separated to reduce stiction caused by charging via the strong electric field that may be produced when the two layers are brought close to one another. In some implementations, one or more dielectric layers with a total thickness of about $\lambda/2$ may be disposed on the surface of the absorber layer and/or the mirrored surface. As such, the white state may correspond to a configuration wherein the absorber layer is placed at the first null of the standing wave from the mirrored surface of the mirror stack 705.

In some MS-IMODs, the minimum field intensity (the standing wave) of different wavelengths does not spatially overlap. Therefore, the color of the white state produced by such MS-IMODs may be shifted depending on the location of an absorber layer of the absorber stack. For example, when the location of the absorber layer corresponds with the null of green wavelength field, the reflected green color is reinforced. Therefore, in such instances the white-state color is tinted with green.

Accordingly, some MS-IMOD implementations provide an improved white-state color by incorporating a mirror stack or an absorber stack that includes an attenuator. The attenuator may be capable of reducing the amount of green light reflected when the MS-IMOD is in a white state.

An optical layer in a mirror stack or an absorber stack may serve as an attenuator. The optical layer may include a plurality of micro-sized or nano-sized particles. The term "micro-sized particle" refers to a particle having at a maximum dimension between 1 and 1000 microns. For example, the largest of the length, width, height, or diameter of a micro-sized particle is less than 1000 microns. The term "nano-sized particle" refers to particles having a maximum dimension between 1 nanometer and 1 micron. The particles may be configured to absorb visible light at one or more wavelengths. Thus, the optical layer may serve to absorb or at least attenuate energy of light corresponding to one or more wavelength ranges in an IMOD or other EMS display device.

Figure 8A:
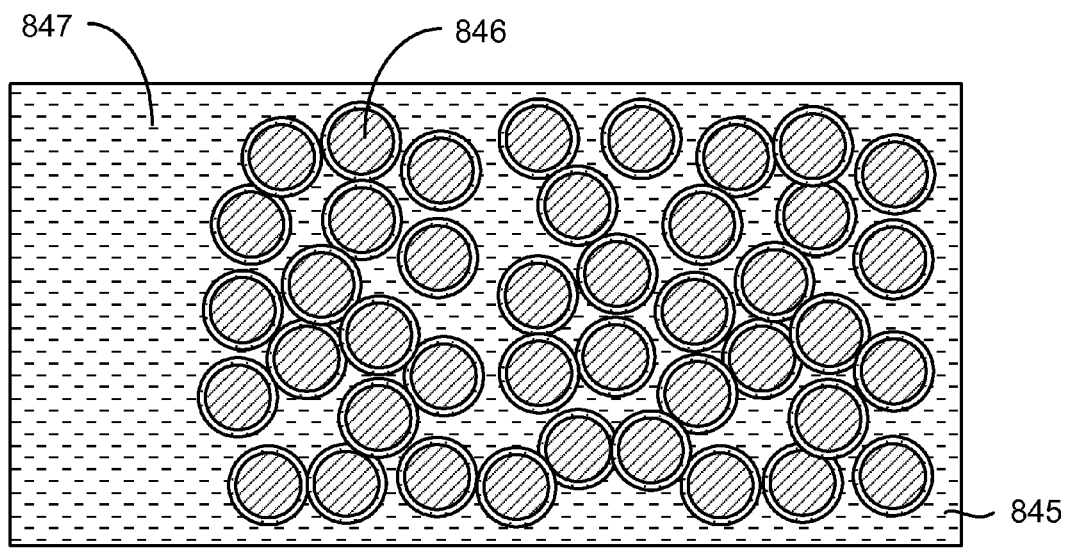
FIG. 8A shows an example of a cross-sectional schematic side view of an optical layer with absorber particles.
Figure 8B:
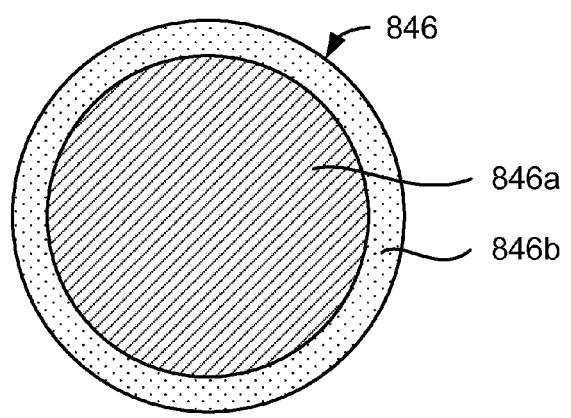
FIG. 8B shows an example of a magnified view of an absorber particle in FIG. 8A.

FIGS. 8A and 8B show an example of an optical layer with absorber particles. FIG. 8A shows an example of a cross-sectional schematic side view of an optical layer with absorber particles. The optical layer 845 can include a plurality of particles 846 in a host material 847. The host material 847 can include an electrically insulating material, such as a dielectric material or polymer. In some implementations, the absorbing properties of the optical layer 845 can be enhanced by doping the host material 847 with ink or other absorbing agents. The particles 846 can be dispersed in the host material 847, and the particles may have an average diameter between about 5 nm and about 500 nm. The particles 846 may be referred to as "nanoparticles."

FIG. 8B shows an example of a magnified view of an absorber particle in FIG. 8A. In some implementations, each of the particles 846 can include a core 846a that is encased or otherwise surrounded by a dielectric coating 846b. The dielectric coating 846b can have an average thickness between about 1 nm and about 10 nm across the plurality of particles 846. The dielectric coating 846b can be made of any suitable dielectric material, such as $SiO_2$. In some implementations, the dielectric coating 846b can be the same material as the host material 847. The core 846a of the particles 846 can be made of a suitable optically absorbing material, such as an oxide, a fluoride, and a metal. For example, the core 846a can include at least one of gold, silver, and nickel.

The choice of material of the absorber particle 846 can determine in part the one or more wavelengths of absorption in the optical layer 845. For example, there can be a range of options for narrow band absorber materials. In some implementations, the optical layer 845 may be configured to attenuate a wavelength range corresponding to green colors. This can reduce a greenish tint that may be produced in a white color state of an IMOD. This can be done by selecting a material such as $C_{21}H_{21}N_2S_2$ that can absorb light at a wavelength of 550 nm. $C_{21}H_{21}N_2S_2$ is commercially available at American Dye Source, Inc. in Quebec, Canada. In some implementations, the optical layer 845 may be configured to radiate energy of light corresponding to one or more wavelength ranges. For example, the optical layer 845 may be configured to radiate a wavelength range corresponding to red colors. This can further correct and otherwise improve color in an IMOD. Also, the absorber particles 846 in the optical layer 845 may be configured to shape and magnify the absorption strength of the optical layer 845. In some implementations, the absorber particles 846 can include inorganic quantum dots.

In addition or in the alternative to the choice of material of the absorber particles 846, the size of the particles 846 and the density of the particles 846 may tune the optical characteristics of the optical layer 845. For instance, the size of the particles 846 may be configured to tune the resonant frequency of absorption, and the density of the particles 846 may be configured to tune the amount of absorption. By adjusting the size of the particles 846, one or more absorption peaks can be introduced at certain wavelengths, thereby attenuating certain colors. By adjusting the density of the particles 846, the size of the absorption peaks can be adjusted to intensify or diminish the absorption. The density of the particles 846 can depend on a number of factors, such as the solubility of the particles 846 in the host material 847, the choice of material of the particles 846, the choice of material of the host material 847, and the thickness of the optical layer 845.

In some implementations, the particles 846 may not only control the resonant frequency of absorption peaks, but also the optical dispersion properties and bulk refractive index. In some implementations, the choice of material of the particles 846 may perform differently in different host material 847. Moreover, the size and density of the particles 846 may achieve a certain amount of optical dispersion and provide a certain index of refraction. For example, a higher density of particles 846 may provide for a higher bulk refractive index in the optical layer 845.

Figure 9:
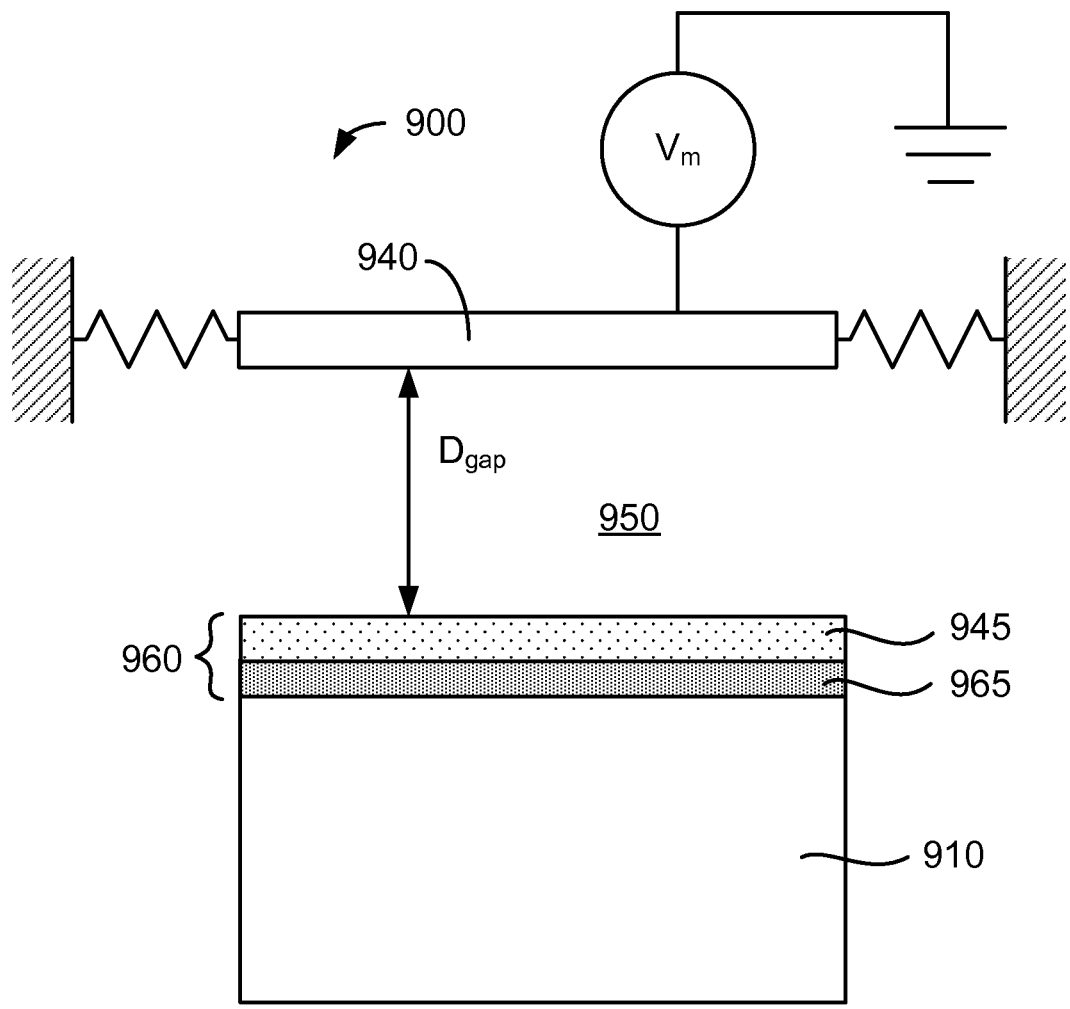
FIG. 9 shows an example of a cross-sectional schematic illustration of an EMS apparatus with an optical layer and functional layer on a substrate.

FIG. 9 shows an example of a cross-sectional schematic illustration of an EMS apparatus with an optical layer and functional layer on a substrate. An EMS apparatus 900 can include a functional layer 965 formed over a substrate 910. The substrate 910 can be formed of any suitable substrate material, including a substantially transparent material, such as glass or plastic. Transparency as used herein can be defined as transmittance of visible light of about 70% or more, such as about 80% or more, or about 90% or more. An empirical definition of transparency for the EMS display device can be the fraction of light transmitted through the apparatus at which a displayed image may still be effectively viewed by a viewer. In some implementations, such as highly emitting OLED displays or high-intensity backlights for LCD displays, the transparency of a structure/layer such as the substrate 910 may be below about 70% and still be considered transparent or substantially transparent. In some implementations, the substrate 910 can have a thickness between about 10 microns and about 1100 microns.

The functional layer 965 may be part of an absorber stack or absorber 960. In some implementations, the functional layer 965 may serve one or more functions in the absorber 960. First, the functional layer 965 may be configured to absorb light so that a distance $D_{gap}$ between the functional layer 965 and a reflective layer in a movable electrode 940 results in optical interference. For example, such a distance $D_{gap}$ may be the size of a gap 950, in some implementations. Second the functional layer 965 may be configured to serve as an electrical terminal, so that an electrostatic attraction between the functional layer 965 and an electrically conductive layer in the movable electrode 940 can electrically drive the EMS apparatus 900.

While the functional layer 965 in the absorber 960 may serve as both an optically absorbing layer for optical interference as well as an electrically active terminal, some implementations of the EMS apparatus 900 may decouple the optical properties from the electrical properties in the functional layer 965. In some implementations, the functional layer 965 may be configured for interferometric optical absorption without being configured as an electrically active terminal. Examples of such implementations may be described with respect to FIGS. 10-12. In some implementations, the functional layer 965 may be configured as an electrically active terminal without being configured for interferometric optical absorption. For example, the functional layer 965 may be electrically conductive but substantially transparent.

In implementations where the functional layer 965 is configured as an electrically active terminal but not configured for interferometric optical absorption, the optical layer 945 may be configured for interferometric optical absorption. Thus, the functional layer 965 may serve as an active electrode in the EMS apparatus 900. A voltage may be applied between the movable electrode 940 and the functional layer 965 to cause actuation of the movable electrode 940 toward the functional layer 965. The optical layer 945 may be positioned over the functional layer 965. While the example in FIG. 9 illustrates the optical layer 945 disposed directly on the functional layer 965, it is understood that the optical layer 945 may be positioned anywhere between the movable electrode 940 and the functional layer 965. In some implementations, the optical layer 945 may be separated from the functional layer 965 by a dielectric layer. An example of such an implementation can be described with reference to FIG. 10. In some implementations, the optical layer 965 may be connected to and disposed directly below the movable electrode 940.

The optical layer 945 may be configured for interferometric optical absorption but not configured as an electrically active terminal. An example of such an optical layer 945 can be the optical layer 845 described in FIGS. 8A and 8B, where the optical layer 845 has absorber particles 846 in an electrically insulating host material 847. The particles 846 may be made of a material with sufficient size and density to interferometrically absorb light while being contained in an electrically insulating material. The functional layer 965 may be configured as an electrically active terminal but not configured for achieving optical interference with the reflective layer in the movable electrode 940 in the EMS apparatus 900.

In implementations where the functional layer 965 is configured as both an interferometric optical absorber and as an electrically active terminal, the optical layer 945 may be part of or serve as an attenuator. The functional layer 965 may include optically absorbing properties and electrically conductive properties. The functional layer 965 may be at least partially reflective and partially absorptive of visible light. In some implementations, the functional layer 965 may include vanadium (V), chromium (Cr), molybdenum (Mo), molychrome (MoCr), and any other such material. In some implementations, the functional layer 965 can have a thickness between about 20 Å and about 100 Å. While the example in FIG. 9 illustrates the optical layer 945 disposed directly on the functional layer 965, it is understood that the optical layer 945 may be positioned anywhere between the movable electrode 940 and the functional layer 965. The optical layer 945 may serve as or be part of an attenuator to attenuate energy of light corresponding to one or more wavelength ranges. Thus, the functional layer 965 coupled with the reflective layer in the movable electrode 940 may interferometrically reflect/absorb light, while the optical layer 945 may be capable of tuning optical characteristics of the reflected/absorbed light. Specifically, a gap height $D_{gap}$ may define the color(s) reflected from the EMS apparatus 900, and the optical layer 945 may be capable of reducing the amount of reflected light of one or more colors. In some implementations, one or both of the optical layer 945 and the functional layer 965 may include impedance-matching layer(s) to further enhance or diminish reflection of one or more colors. For example, impedance-matching layers may include a high index of refraction layer coupled with a low index of refraction layer. The impedance-matching layers may be capable of providing substantially matching impedance throughout an entire visible wavelength for improved color saturation.

Figure 11:
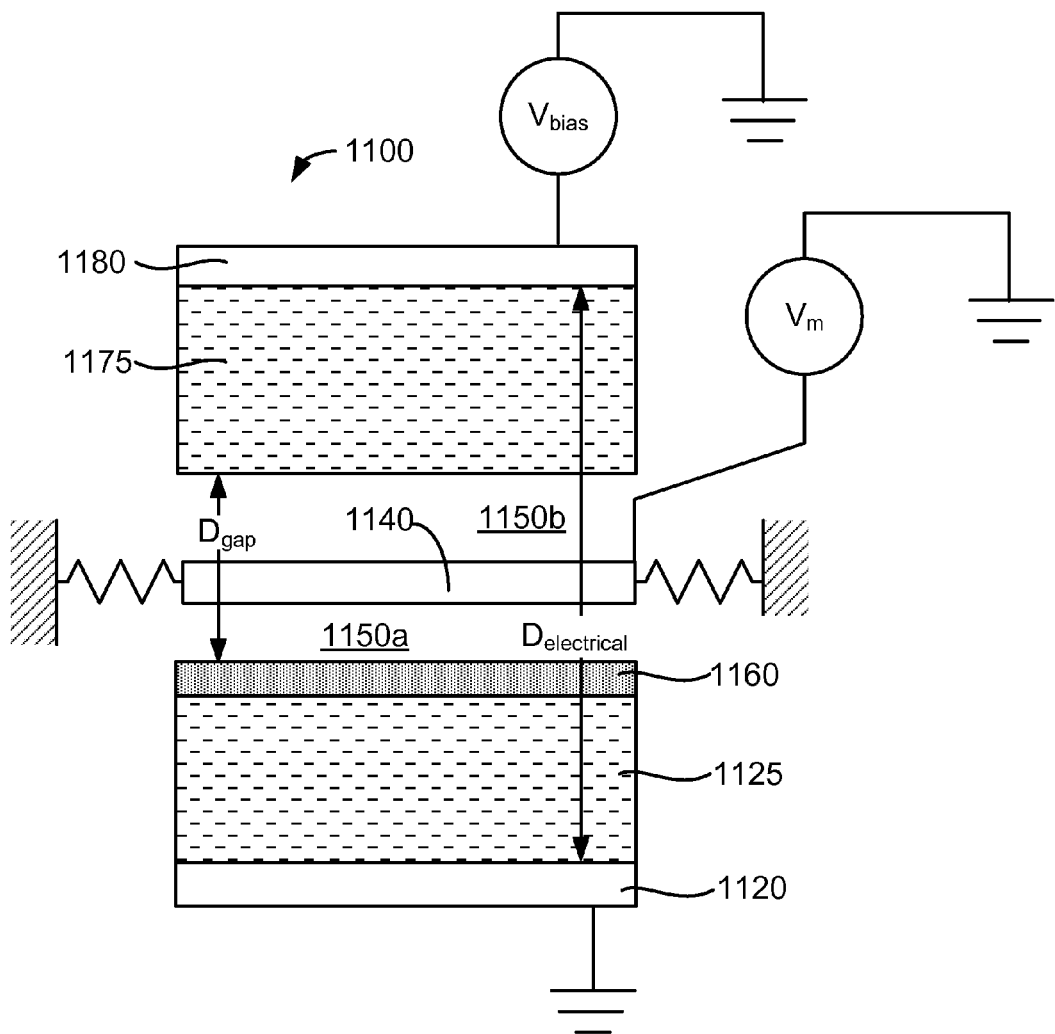
FIG. 11 shows an example of a cross-sectional schematic illustration of a three-terminal EMS apparatus.
Figure 12:
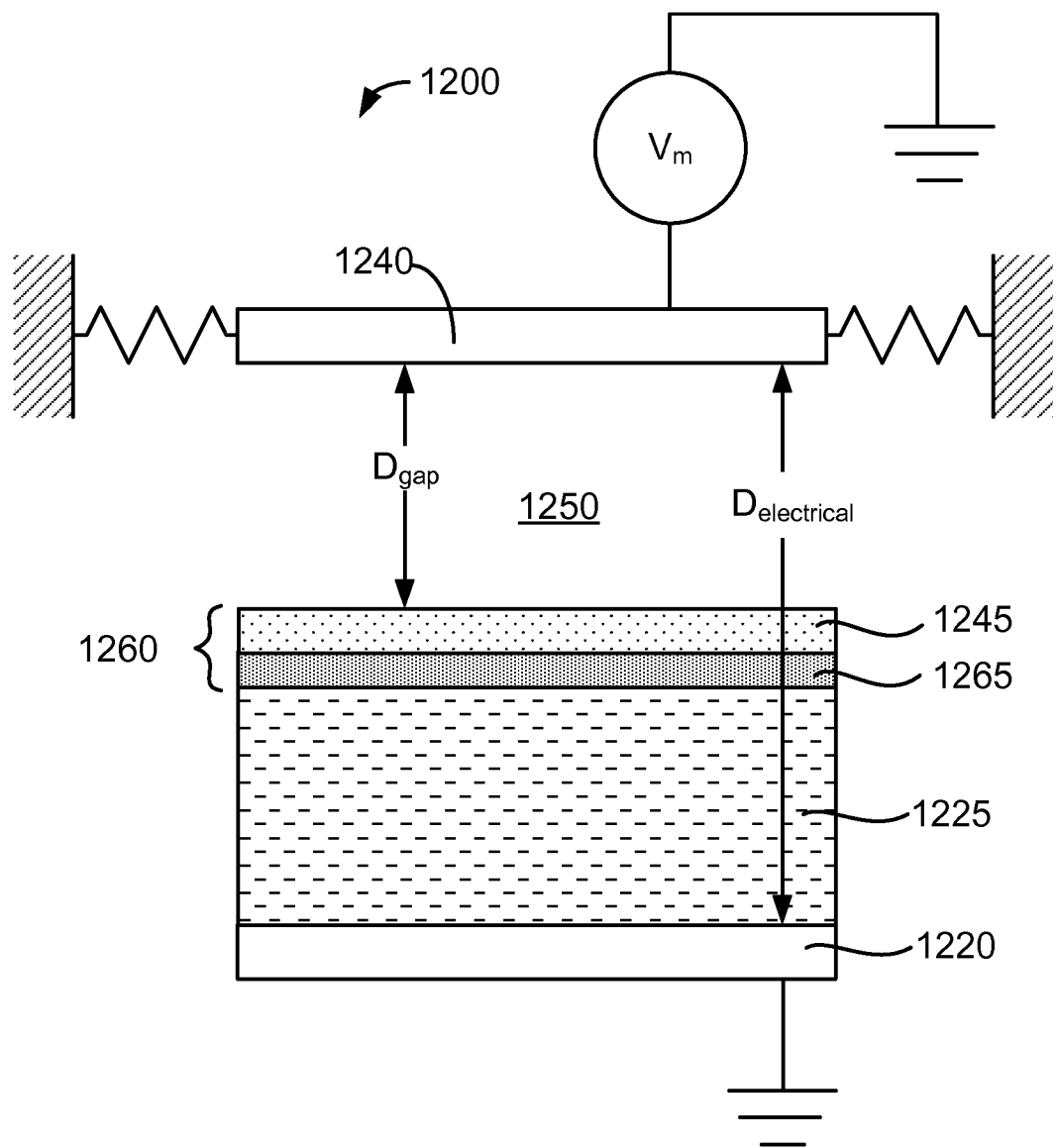
FIG. 12 shows an example of a cross-sectional schematic illustration of an EMS apparatus with an optical layer and an absorbing layer spaced apart from an electrode by a dielectric layer.

Though an absorber in an EMS apparatus may function as both an optical absorber and an electrically active terminal, some implementations of an EMS apparatus may decouple these functions. For example, an optical absorber may be formed separately and spaced apart from a stationary electrode in an EMS apparatus. FIGS. 11-13 illustrate examples of EMS apparatuses where an absorber is separate from a stationary electrode. The examples are meant to be illustrative of parts of an EMS apparatus and it will be readily understood that additional structures, such as shell layers, substrates, mechanical layers, posts, black mask layers, bussing layers, etc., may be present.

Many MEMS and EMS apparatuses apply a voltage to generate an electrostatic attraction between two electrodes. The electrostatic attraction between the two electrodes can induce a nonlinear electrostatic force. The electrostatic force can increase quadratically as the distance between the two electrodes decreases. The equation below can be used to measure electrostatic force F between two electrodes:

$$F=(V^2 \epsilon_0 A_E)/(2D^2)$$

where $A_E$ is the common surface area between the two electrodes, V is the voltage potential between the two electrodes, $\epsilon_0$ is the permittivity of free space, and D is the separate distance between the two electrodes. $D=(z_0-d)$, and $z_0$ is the initial separation distance and d is the deflection distance.

Because electrostatic force is inversely proportional to separation distance between two electrodes, and increases quadratically as the separation distance decreases, the position of one of the electrodes can become unstable as the electrode travels across the separation distance. For example, after the separation distance between the electrodes decreases by about one-third, the relative position of the electrodes can become unstable, and the electrodes can quickly travel the remaining separation distance. This phenomenon is called "snap-through," and can limit the useful range of motion in a MEMS or EMS apparatus.

Moreover, as the movable electrode tilts by even the slightest degree, charge can build up in the area of the tilt that serves as a positively reinforcing mechanism, which results in tilt instability. The tilt instability may result from any asymmetry in the MEMS or EMS apparatus, including mismatched tethers, shape of the electrodes, or uneven initial separation distance. Beyond a certain critical travel range or tilt angle, which depends on the ratio of the electrostatic to the mechanical restoring torques, the tilting becomes unstable and one side or corner of the device will snap down.

Figure 10:
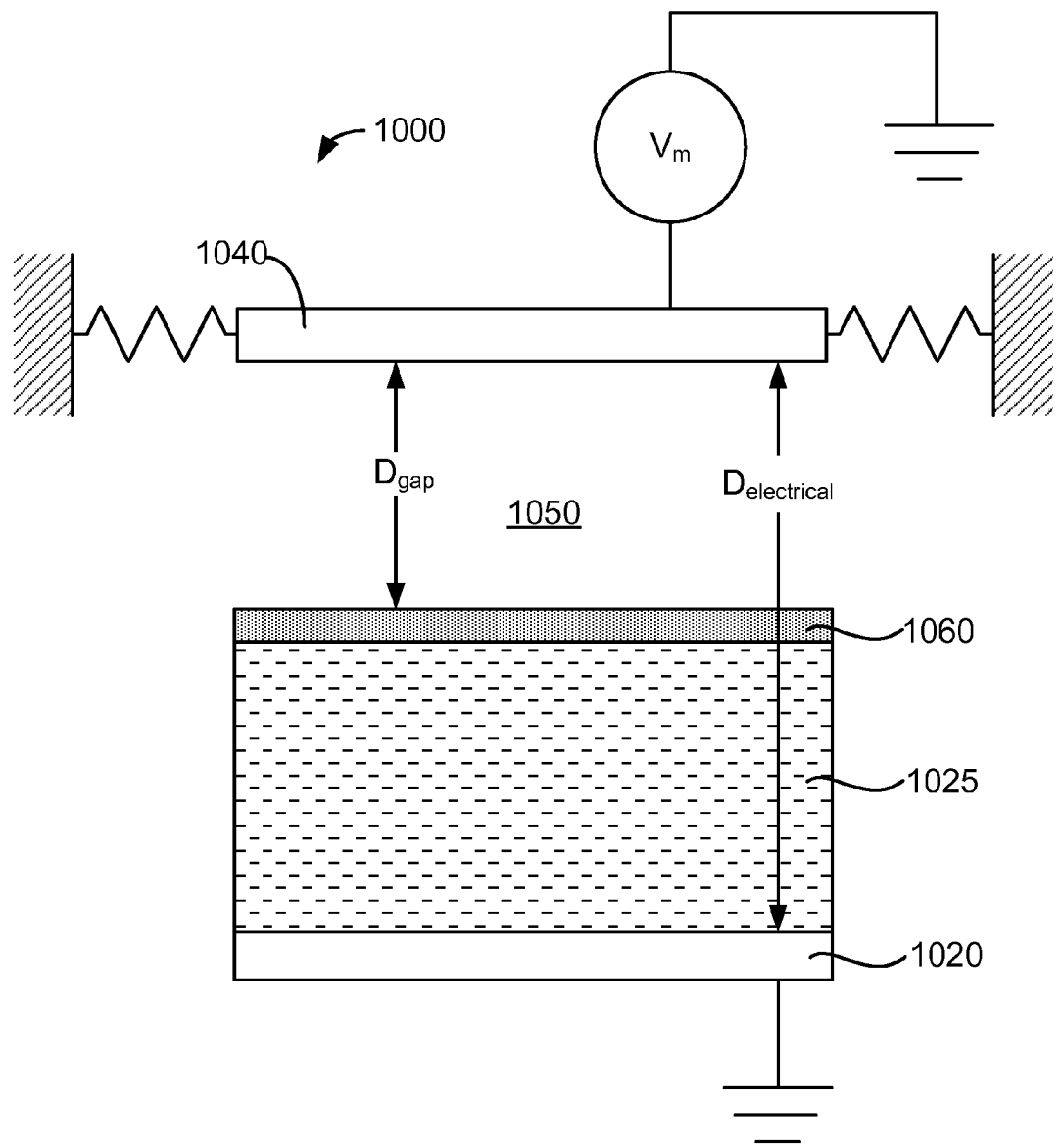
FIG. 10 shows an example of a cross-sectional schematic illustration of a two-terminal EMS apparatus.

FIG. 10 shows an example of a cross-sectional schematic illustration of a two-terminal EMS apparatus. A two-terminal EMS apparatus 1000 can include a stationary electrode 1020 separated from an absorber 1060 by a dielectric layer 1025. The EMS apparatus 1000 can further include a movable electrode 1040 over the absorber 1060, where the movable electrode 1040 and the absorber 1060 may be separated by a gap 1050 when the movable electrode 1040 is in an open position (e.g., unactuated). The size of the gap 1050 may correspond to different reflected visible wavelengths of color produced by the EMS apparatus 1000. In some implementations, the stationary electrode 1020 may be formed over a substrate (not shown) and connected to a ground terminal. In some implementations, the stationary electrode 1020 may be made of a material that is electrically conductive and substantially transparent. Both the stationary electrode 1020 and a substrate on which the stationary electrode 1020 is formed can be substantially transparent.

The two-terminal EMS apparatus 1000 may have electrically active terminals at the stationary electrode 1020 and the movable electrode 1040. The absorber 1060 may be electrically insulating or otherwise non-electrically active. An example of an absorber structure that can be electrically insulating or otherwise non-electrically active can be the optical layer 845 described above with reference to FIGS. 8A and 8B. Another example of an absorber structure that can be electrically insulating or otherwise non-electrically active can be the absorber 1360 described below with reference to FIGS. 13A and 13B.

The dielectric layer 1025 may be disposed over the stationary electrode 1020. The dielectric layer 1025 provides an increased amount of separation between the stationary electrode 1020 and the movable electrode 1040. Typically, when a voltage is applied between two electrodes, the separation distance between the two electrodes is about equal to the size of the gap 1050. However, by providing a dielectric layer 1025 to space apart the stationary electrode 1020 from the absorber 1060, a separation distance $D_{electrical}$ between the movable electrode 1040 and the stationary electrode 1020 can be greater than a gap distance $D_{gap}$ between the movable electrode 1040 and the absorber 1060.

When the movable electrode 1040 travels across the gap 1050 beyond a threshold distance between the two electrodes, the position of the movable electrode 1040 may become unstable and snap-through the remaining distance across the gap 1050. In some implementations, the threshold distance before reaching an unstable position can be a percentage of the separation distance $D_{electrical}$. Thus, the gap distance $D_{gap}$ can be designed in the EMS apparatus 1000 so as to not be capable of exceeding the threshold distance. For example, the gap distance $D_{gap}$ can be between about 15% and about 45% of the separation distance $D_{electrical}$, or between about 25% and about 35% of the separation distance $D_{electrical}$, or about 33% of the separation distance $D_{electrical}$. Therefore, the movable electrode 1040 may travel across the gap distance $D_{gap}$ within a stable region of operation. A gap distance $D_{gap}$ within a stable region of operation can be between about 100 nm and about 250 nm.

The dielectric layer 1025 may be made of an electrically insulating material and have a thickness that provides a sufficiently large enough separation distance $D_{electrical}$ between movable electrode 1040 and the stationary electrode 1020. In some implementations, the thickness of the dielectric layer 1025 can be between about 100 nm and about 500 nm, such as between about 300 nm and about 400 nm. The thickness of the absorber 1060 can add to the separation distance $D_{electrical}$. By way of an example, an IMOD can tune continuously within a stable region of operation for a distance of about 180 nm, and have an unstable region for a distance of about 360 nm after the initial stable region of operation. Thus, a separation distance $D_{electrical}$ between two electrodes can be about 540 nm, a gap distance $D_{gap}$ can be about 180 nm, and a combined thickness of the dielectric layer 1025 and the absorber 1060 can be about 360 nm.

FIG. 11 shows an example of a cross-sectional schematic illustration of a three-terminal EMS apparatus. A three-terminal EMS apparatus 1100 can include multiple electrodes and multiple gaps. As illustrated in the example in FIG. 11, the movable electrode 1140 can actuate in two different directions towards two different electrodes, namely an upper electrode 1180 and a lower electrode 1120. The lower electrode 1120 may be formed on a substrate (not shown), where each of the lower electrode 1120 and the substrate may be substantially transparent. The three-terminal EMS apparatus 1100 can include a lower gap 1150a and an upper gap 1150b through which the movable electrode 1140 can actuate. The upper electrode 1180 may be further spaced apart from the movable electrode 1140 by an upper dielectric layer 1175, and the lower electrode 1120 may be further spaced apart from the movable electrode 1140 by a lower dielectric layer 1125 and an absorber 1160. The absorber 1160 can be electrically insulating or otherwise non-electrically active. A voltage $V_{bias}$ may be applied across the three-terminal EMS apparatus 1100 between the upper electrode 1180 and the lower electrode 1120. Thus, a separation distance $D_{electrical}$ can be greater than if the separation distance $D_{electrical}$ were between the movable electrode 1140 and the lower electrode 1120. A gap distance $D_{gap}$ across gaps 1050a and 1050b can be designed to be within a stable region of operation of the separation distance $D_{electrical}$. In some implementations, the three-terminal EMS apparatus 1100 can provide for an increased stable region of operation than if the EMS apparatus were a two-terminal device.

FIG. 12 shows an example of a cross-sectional schematic illustration of an EMS apparatus with an optical layer and an absorbing layer spaced apart from an electrode by a dielectric layer. Like the EMS apparatus 900 in FIG. 9, an EMS apparatus 1200 can include an absorber stack or absorber 1260, where the absorber 1260 includes an optical layer 1245 over an absorbing layer 1265. The EMS apparatus 1200 can further include a movable electrode 1240 over the absorber 1260 and spaced apart from the absorber 1260 by a gap 1250 when the EMS apparatus 1200 is in the open position. The absorber 1260 can decouple its absorption properties from its electrically conductive properties so that the absorbing layer 1265 may be configured for interferometric optical absorption but not configured as an electrically active terminal. Instead, a stationary electrode 1220 can serve as an electrically active terminal and can be spaced apart from the absorbing layer 1265 by a dielectric layer 1225. Rather than a separation distance $D_{electrical}$ between two electrodes being a distance $D_{gap}$ between the movable electrode 1240 and the absorber 1260, the separation distance $D_{electrical}$ can be between the movable electrode 1240 and the stationary electrode 1220. As such, the separation distance $D_{electrical}$ can be increased by at least the thickness of the dielectric layer 1225. While the example in FIG. 12 illustrates the optical layer 1245 disposed directly on the absorbing layer 1265, it is understood that the optical layer 1245 may be positioned anywhere between the movable electrode 1240 and the absorbing layer 1265. In some implementations, for example, the optical layer 1245 may be connected to and disposed directly below the movable electrode 1240. The optical layer 1245 may be configured to attenuate energy of light corresponding to one or more wavelength ranges.

Figure 13B:
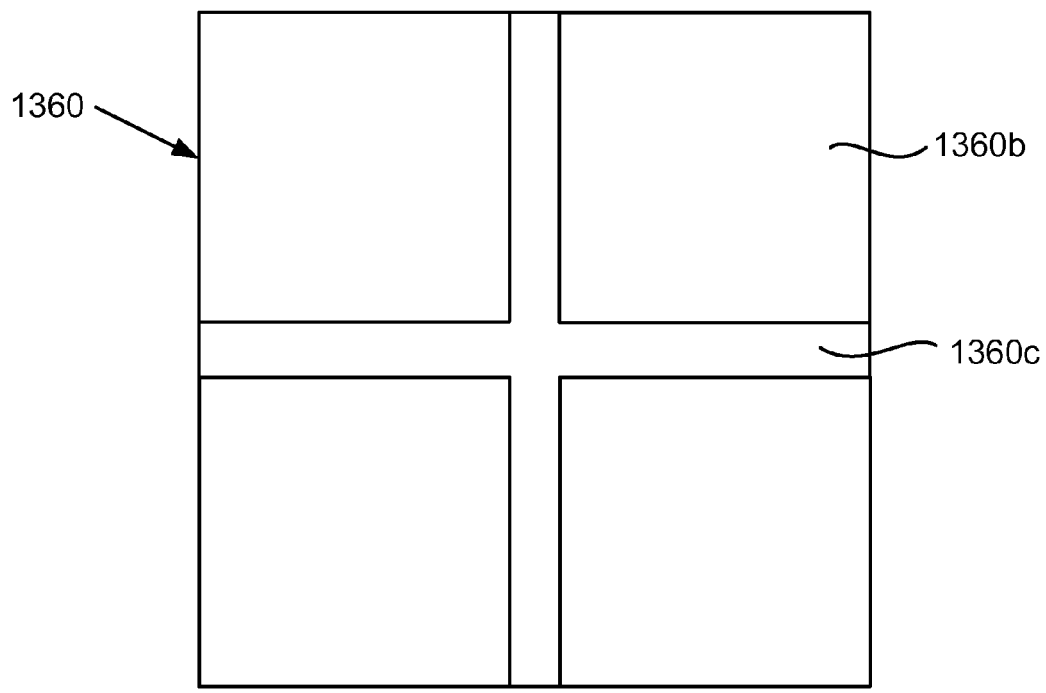
FIG. 13B shows an example of a schematic top-down view of the patterned multi-layer absorber in FIG. 13A.
Figure 13A:
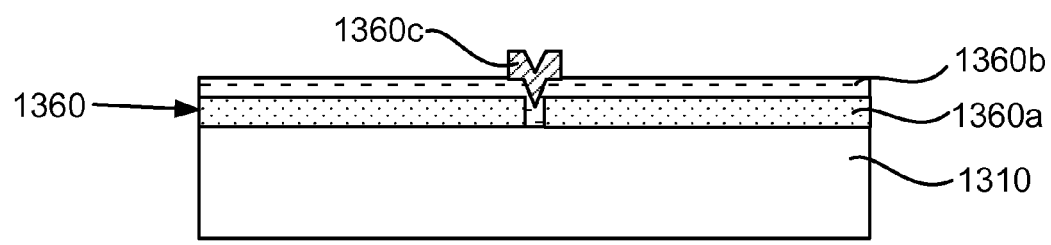
FIG. 13A shows an example of a cross-sectional schematic side view of patterned multi-layer absorber.

In the disclosed implementations of the aforementioned EMS apparatuses, an absorber or absorbing layer may be configured for optical interference with the reflective layer of the EMS apparatus, but not configured as an electrically active terminal. The absorber or absorbing layer can be electrically insulating or at least have a reduced lateral charge mobility. FIG. 13A shows an example of a cross-sectional schematic side view of patterned multi-layer absorber, and FIG. 13B shows an example of a schematic top-down view of the patterned multi-layer absorber in FIG. 13A. The patterned multi-layer absorber 1360 can behave like a continuous metal in its absorption properties but not like a continuous metal in its electrical conductivity properties.

In FIGS. 13A and 13B, the patterned multi-layer absorber 1360 can include a first absorber layer 1360a over a substrate 1310. The first absorber layer 1360a may be discontinuous and yield two or more laterally separate regions across an absorber plane. The discontinuities can include gaps, trenches, grooves, holes, or other forms of separation that divide the first absorber layer 1360a into two or more unconnected regions. In some implementations, the first absorber layer 1360a may include at least two laterally separate regions symmetrically disposed about a center of the absorber plane. For example, the first absorber layer 1360a may include four laterally separate regions, where the regions are separated by a space extending orthogonally in vertical and horizontal directions through the center of the absorber plane. In some implementations, the first absorber layer 1360a can be made of a metal and can have a thickness between about 4 nm and about 20 nm.

The patterned multi-layer absorber 1360 can further include a dielectric film 1360b covering the first absorber layer 1360a and substantially filling the space between the regions of the first absorber layer 1360a. Substantially filling the space can refer to filling more than 70%, more than 80%, or more than 90% of the space. A person of ordinary skill in the art will readily understand that holes, gaps, openings, or voids may still be present when the dielectric film 1360b substantially fills the space. The dielectric layer 1360b can be made of any suitable electrically insulating material that can restrict charge flow across the absorber plane of the first absorber layer 1360a. In some implementations, the dielectric layer 1360b can be deposited to form a uniform layer over the first absorber layer 1360a and leave a notch over the space between the regions of the first absorber layer 1360a. In some implementations, the dielectric film 1360b can have a thickness between about 1 nm and about 10 nm.

The patterned multi-layer absorber 1360 can further include a second absorber layer 1360c over the dielectric film 1360b and above the space between the regions of the first absorber layer 1360a. The second absorber layer 1360c can fill the notch left by the dielectric film 1360b. In some implementations, the second absorber layer 1360c can extend into the space and fill the remainder of the space between the regions of the first absorber layer 1360a. In some implementations, the second absorber layer 1360c can be made of a metal and can have a thickness between about 4 nm and about 20 nm. The second absorber layer 1360c can be deposited and patterned so as to leave an overhanging portion over the dielectric film 1360b and above the space between the regions of the first absorber layer 1360a. Thus, the second absorber layer 1360c can create an electrically "floating" absorber, where the second absorber layer 1360c is suspended over the dielectric film 1360b and the rest of the patterned multi-layer absorber 1360. Thus, the patterned multi-layer absorber 1360 can eliminate or otherwise reduce the effects of snap-through and tilt instability.

Figure 14:
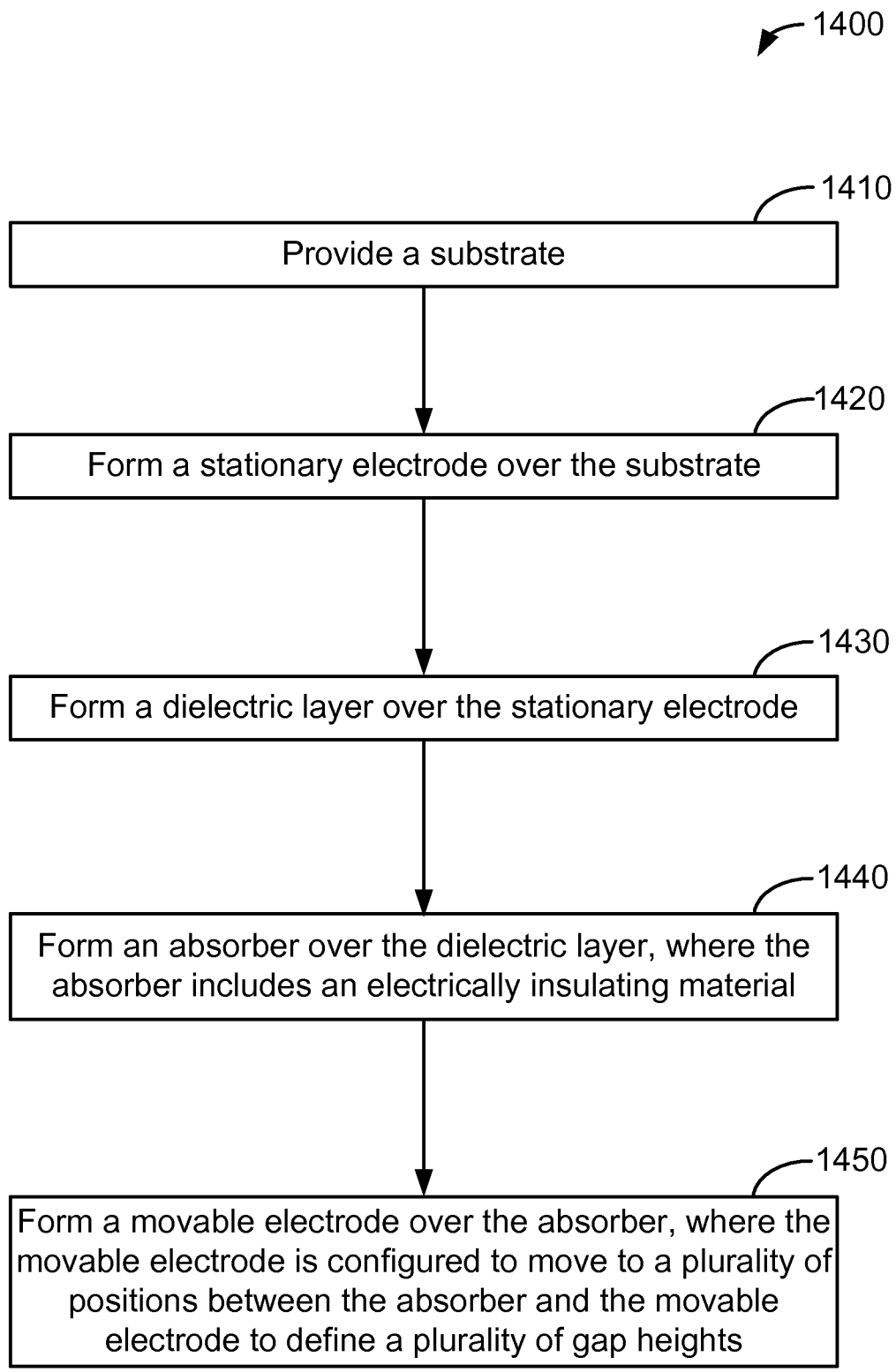
FIG. 14 shows a flow diagram illustrating an example method of manufacturing an EMS apparatus.

FIG. 14 shows a flow diagram illustrating an example method of manufacturing an EMS apparatus. A person having ordinary skill in the art will readily understand that additional stages not shown in FIG. 14 may also be present. For example, it will be readily understood that additional processes of depositing underlying or overlying layers, such as sacrificial layers, substrates, posts, mechanical layers, planarization layers, black mask layers, bussing layers, etc., may be present. Some implementations may perform the steps in different orders and/or with different, fewer, or additional steps than the ones shown in FIG. 14.

At block 1410 of a process 1400, a substrate is provided. The substrate can be formed of any suitable substrate material as disclosed above. In some implementations, the substrate can be formed of a substantially transparent material, such as glass or plastic.

At block 1420 of the process 1400, a stationary electrode is formed over the substrate. In some implementations, the stationary electrode may be substantially transparent.

At block 1430 of the process 1400, a dielectric layer is formed over the stationary electrode. The dielectric layer may be relatively thick and separate an absorber from the stationary electrode.

At block 1440 of the process 1400, an absorber is formed over the dielectric layer, where the absorber includes an electrically insulating material. In some implementations, the electrically insulating material may be part of an optical layer that includes a plurality of particles, where the particles have an average diameter of between about 5 nm and about 500 nm. The particles can at least partially absorb light and can be made of an oxide, a fluoride, or a metal. The particles can be coated with a dielectric coating, the dielectric coating having an average thickness between about 1 nm and about 10 nm. The optical layer may be configured to attenuate energy of light corresponding to one or more wavelength ranges. An example of such an optical layer can be described with reference to the optical layer 845 in FIGS. 8A and 8B. In some implementations, the electrically insulating material may be part of a patterned multi-layer absorber, which can be described with reference to the absorber 1360 in FIGS. 13A and 13B.

The absorber may be configured to decouple its absorption properties from its electrically conductive properties, so that the absorber need not serve as both a stationary electrode and as an optically absorbing layer. Rather, the absorber may be separated from a stationary electrode by the dielectric layer.

In some implementations, forming the absorber over the substrate may include forming an absorbing layer over the dielectric layer and forming an optical layer over the absorbing layer. The absorbing layer may be configured to provide optical interference with a reflective layer in a movable electrode of the EMS apparatus. The optical layer may couple with the absorbing layer to tune the optical characteristics of the reflected/absorbed light by enhancing or diminishing reflectance of one or more colors. For example, the optical layer may be configured to attenuate energy of light corresponding to one or more wavelength ranges.

At block 1450 of the process 1400, a movable electrode is formed over the absorber, where the movable electrode is configured to move to a plurality of positions between the absorber and the movable electrode to define a plurality of gap heights. Each of the gap heights may correspond to a different reflected visible wavelength of the EMS apparatus. The movable electrode may be formed over a gap between the movable electrode and the absorber, where the gap can be defined by a release of sacrificial material. Where the absorber is separated from a stationary electrode by a dielectric layer, each of the gap heights may be within a stable region of operation of the EMS apparatus.

Typically, MEMS and EMS devices have been constructed using inorganic materials. However, many inorganic materials may not have properties that are compatible with devices that must bend and restore to their original shape, such as flexible display devices. For example, inorganic dielectric materials can be too stiff while metals can be too stiff or ductile. Moreover, deposition and/or patterning of inorganic materials in MEMS and EMS devices may involve conventional semiconductor fabrication techniques. This can raise the cost of fabrication.

The incorporation of organic materials in MEMS and EMS devices can introduce mechanical flexibility to the devices. Organic materials can also offer advantages in ease of processing, being relatively light-weight, having high flexibility in structures, having high dimensional stability, having a relatively low cost, and more.

However, many MEMS and EMS devices may not be constructed out of organic materials as it may be undesirable to have moving parts made of soft, elastomeric materials. Organic materials may not be as structurally rigid and strong as inorganic materials. Organic materials may also have a relatively low melting point and poor electrical conductivity, which may further limit its incorporation in MEMS and EMS devices. When the MEMS and EMS devices are display devices, organic materials having appropriate optical properties (e.g., being substantially transparent) may be limited. Constructing such MEMS and EMS devices with organic materials having the appropriate mechanical, electrical, and optical properties may be challenging.

Thus, an implementation of the subject matter described herein pertains to an EMS device that couples electromechanical actuation with a combination of elastomeric and structural plastics that can be efficiently shaped. In some implementations, the resulting EMS device may provide sufficient reflective and transmissive characteristics for reflective display applications.

Figure 15:
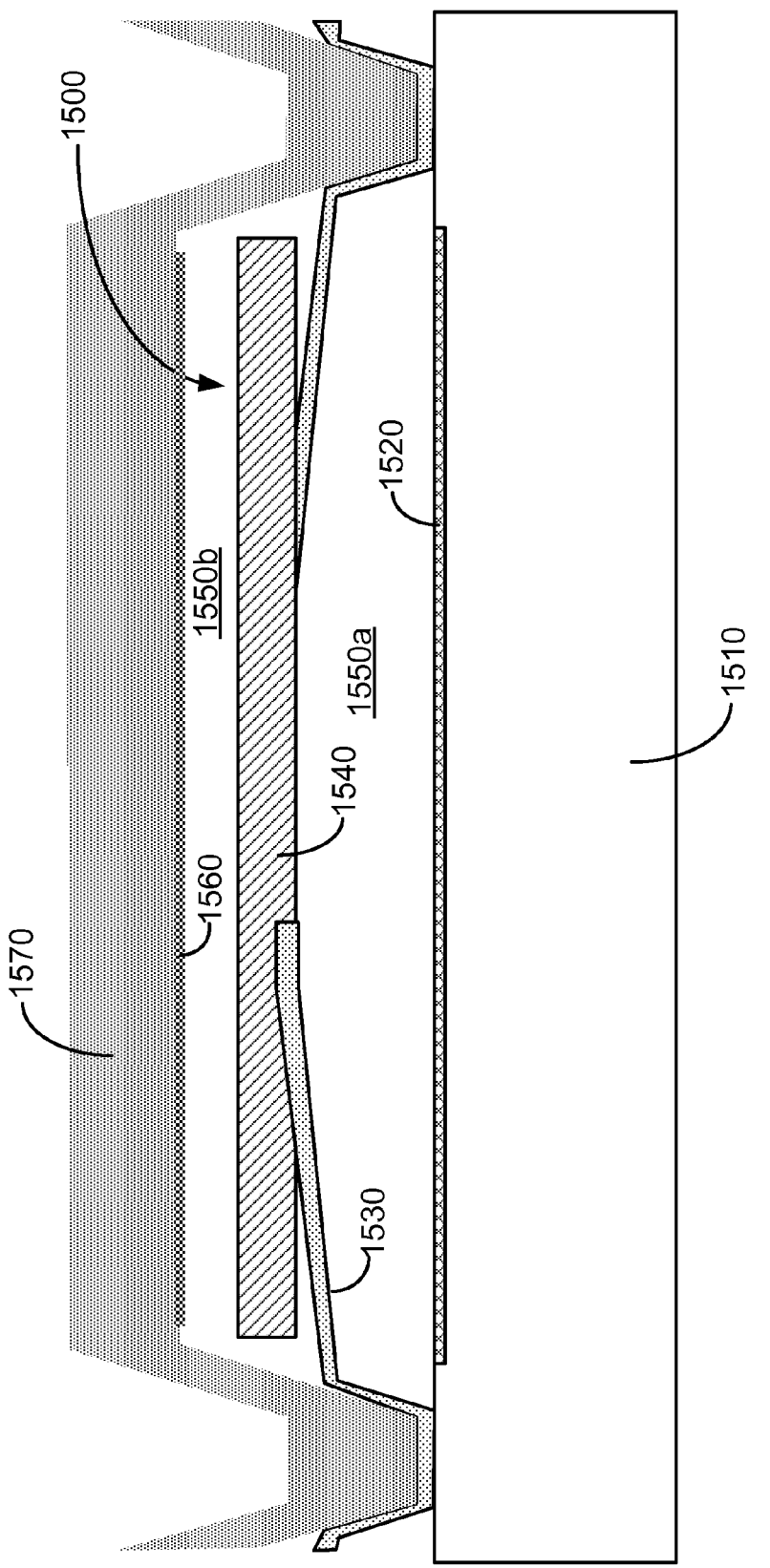
FIG. 15 shows an example of a cross-sectional schematic illustration of an EMS element or EMS display element.

FIG. 15 shows an example of a cross-sectional schematic illustration of an EMS element or EMS display element. An EMS element 1500 can include a stationary electrode 1520 over a substrate 1510 and a movable electrode 1540 over the stationary electrode 1520. The stationary electrode 1520 and the movable electrode 1540 can define a gap 1550a therebetween. Support hinges or tethers 1530 may be disposed between the movable electrode 1540 and the substrate 1510 to support the movable electrode 1540.

In some implementations, the substrate 1510 may be made of any number of different substrate materials, including transparent and non-transparent materials. For example, the substrate 1510 may be made of a flexible material that is substantially non-transparent, such as a metal or plastic. In implementations where reflected light does not pass through the substrate 1510 to reach a viewer, the substrate 1510 can include opaque and translucent materials, as well as transparent materials. In some implementations, opaque or translucent materials can have superior structural properties relative to transparent materials. Examples of materials that the substrate 1510 can be made of can include metals, anodized metals, Si, polysilicon (poly-Si), silicon-on-insulator (SOI), plastics, ceramics, polymers, glass, spin-on glass, quartz, alloys, and composites. In some implementations, the substrate 1510 can include a flexible plastic or metal foil with sufficient flexibility for roll-to-roll or web processing. Electronic circuitry such as sensors, transistors, resistors, and capacitors can be formed on the substrate 1510.

In some implementations, a shell or protective layer 1570 may be formed over the movable electrode 1540. The protective layer 1570 may provide mechanical support for subsequent layers and/or protection of the EMS element 1500 from environmental agents and external forces. The protective layer 1570 may be relatively thick, such as greater than about 1 micron, greater than about 3 microns, or more. In some implementations, the protective layer 1570 may include a hole (not shown), which may provide a passage for etchants to pass through for one or more sacrificial layers to be etched. Such a hole may be plugged or otherwise covered by subsequent processes.

In some implementations, the protective layer 1570 may serve as a structural layer providing support for an absorber 1560. In some other implementations, the absorber 1560 may be free of any mechanical support layer supporting it from above, supported by posts, or otherwise suspended over the movable electrode 1540. In some such implementations, the absorber 1560 may be movable. While the example in FIG. 15 shows the absorber 1560 over the movable electrode 1540, it will be readily understood that the absorber 1560 may be positioned on the substrate 1510 or between the substrate 1510 and the movable electrode 1540. In one example, the absorber 1560 may be part of the stationary electrode 1520. In another example, the absorber 1560 may decouple its absorbing properties from its electrically conductive properties so that the absorber 1560 may be above the stationary electrode 1520.

The gap 1550a may further include a space 1550b between the movable electrode 1540 and the protective layer 1570. The movable electrode 1540 may be configured to move across the gap 1550a toward the stationary electrode 1520. In some implementations, the movable electrode 1540 may also be configured to move across the space 1550b toward the protective layer 1570, such as in a three-terminal device. The movable electrode 1540 may actuate toward the protective layer 1570 or the stationary electrode 1520 by electrostatic forces of attraction.

The support hinges 1530 may be symmetrically disposed around the movable electrode 1540. The support hinges 1530 may be able to bend or otherwise deform to allow the movable electrode 1540 to actuate toward the stationary electrode 1520 or the protective layer 1570. The movable electrode 1540 may be substantially parallel to the stationary electrode 1520 or the protective layer 1570 during actuation.

The movable electrode 1540 may be electrically conductive or at least include an electrically conductive layer. In some implementations, the movable electrode 1540 may include one or more layers, such as a reflective layer. The reflective layer may be made out of a metal, such as aluminum, copper, aluminum-copper alloy, or other materials capable of at least partially reflecting visible light. In some implementations, the reflective layer can form a mirror for interferometrically modulating light with the absorber 1560 in the EMS element 1500.

The gap distance between the movable electrode and the stationary electrode 1520 may influence the reflective properties of the EMS element 1500. In some implementations, the movable electrode 1540 can move to three or more positions across the gap 1550a. Depending on the position of the movable electrode 1540, different wavelengths of light can be reflected back through the substrate 1510 or through the protective layer 1570, which can give the appearance of different colors. For example, the movable electrode 1540 can be configured to reflect a color within the red-green-blue color spectrum. When a voltage is applied between electrodes in the EMS element 1500, the movable electrode 1540 may move to different positions toward either the protective layer 1570 or the stationary electrode 1520. In some implementations, the EMS element 1500 may be a three-terminal device, meaning that the EMS element 1500 may be provided with an electrode in each of the stationary electrode 1520, the movable electrode 1540, and the protective layer 1570.

In some implementations, at least some components of the EMS element 1500 may be made of inorganic materials. In some implementations, at least one or all components of the EMS element 1500 may be made of organic materials. The use of organic materials can provide flexibility in structures that can bend or require bending, such as flexible display devices.

An EMS apparatus can include a plurality of mechanical and optical structures made out of organic materials. The EMS apparatus may be part of a reflective display device. An example of such an EMS apparatus may be illustrated in FIGS. 16A-16C.

Figure 16A:
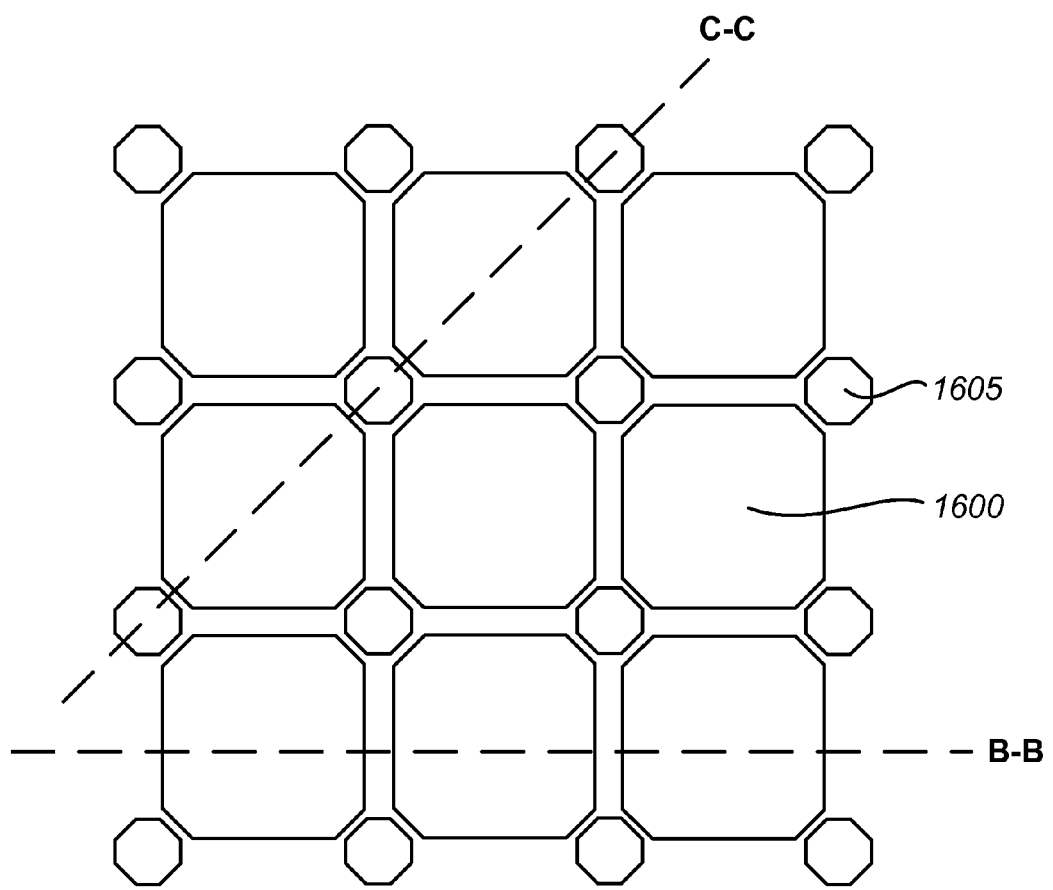
FIG. 16A shows a schematic top-down view of an array of EMS display elements.

FIG. 16A shows a schematic top-down view of an array of EMS display elements. A display device can have a plurality of EMS display elements 1600 arranged as an array. The array of EMS display elements 1600 can be a pixel array to form a display. The EMS display elements 1600 can include IMODs. Other components in the array can be included, such as matrixed active switches and drivers, as well as passive devices such as storage/sensing capacitors and resistors.

Proximate the corner regions of each of the EMS display elements 1600 can be supports 1605. The supports 1605 may be configured to support edge portions of the EMS display elements 1600, such as movable electrode portions of the EMS display elements 1600. In some implementations, the supports 1605 can include vias to provide electrical interconnection between layers for signal routing into and out of different layers of a display device. In some implementations, it may be desirable for the support 1605 to occupy as little space as possible to increase a display area for the EMS display elements 1600. In some implementations, the support 1605 occupies an area of less than about 6 µm×6 µm, less than about 3 µm×3 µm, or less than about 0.5 µm×0.5 µm.

Figure 16B:
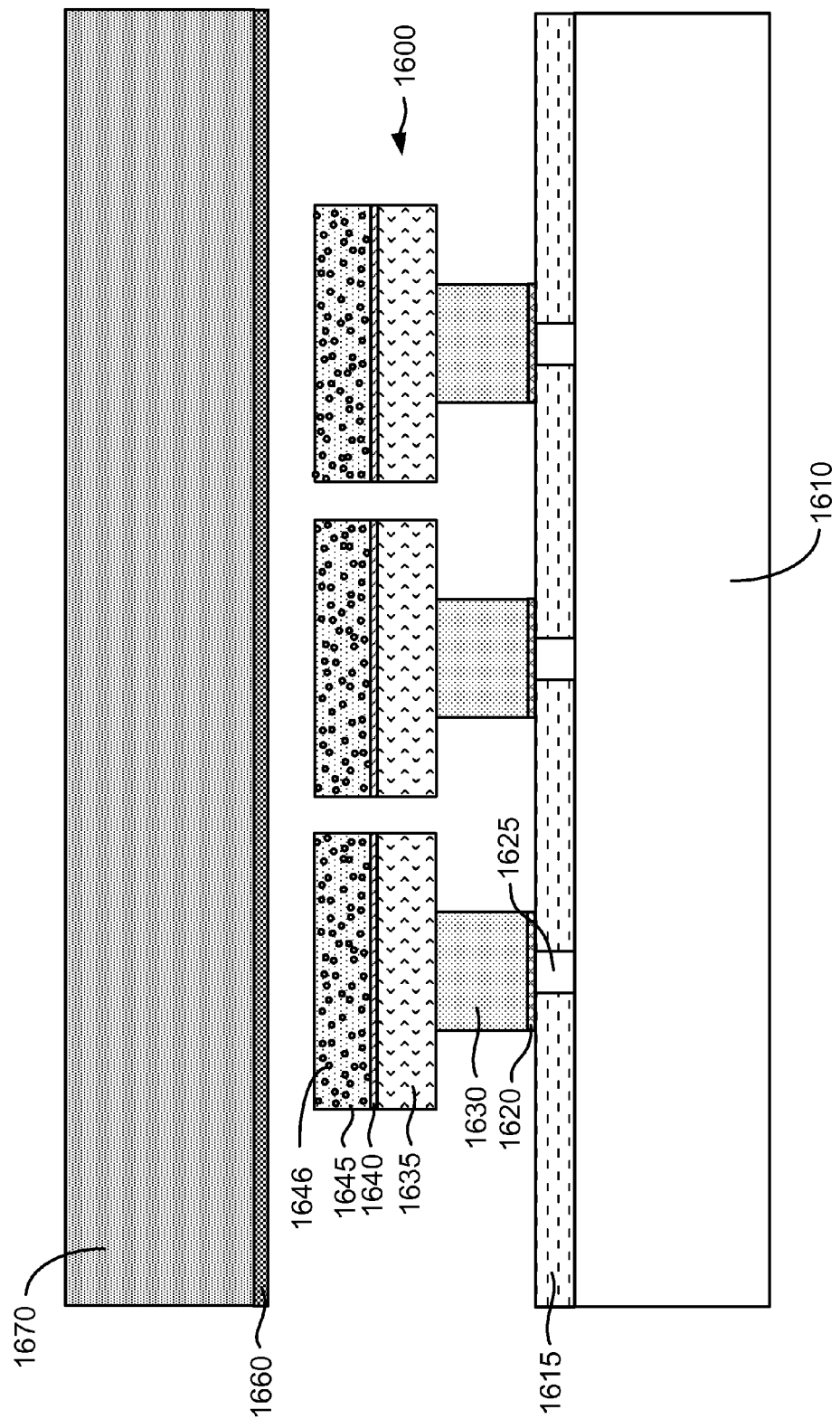
FIG. 16B shows a cross-sectional schematic side view of an array of EMS display elements along line B-B in FIG. 16A.
Figure 16C:
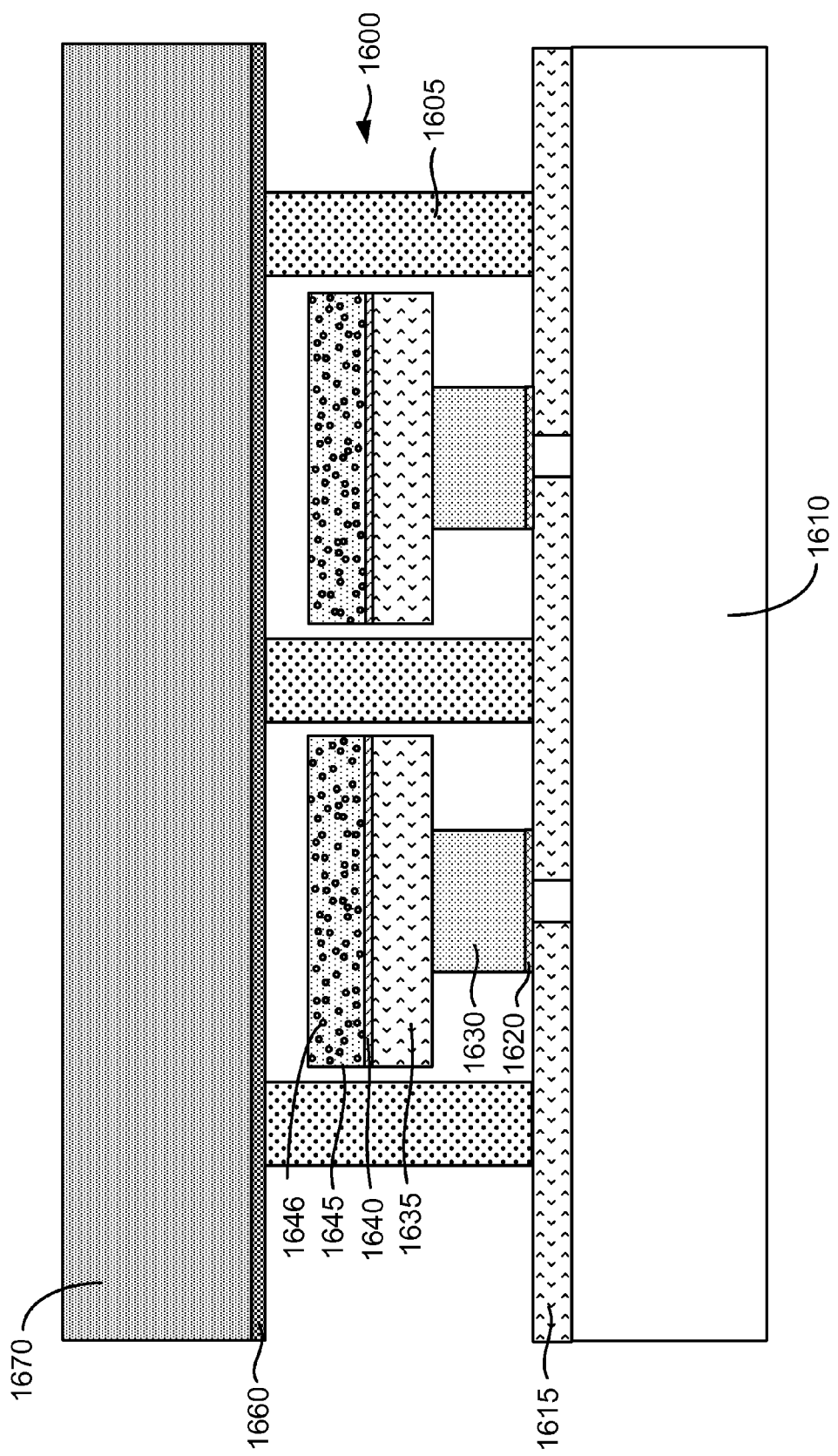
FIG. 16C shows a cross-sectional schematic side view of an array of EMS display elements along line C-C in FIG. 16A.

FIG. 16B shows a cross-sectional schematic side view of an array of EMS display elements along line B-B in FIG. 16A. FIG. 16C shows a cross-sectional schematic side view of an array of EMS display elements along line C-C in FIG. 16A. The EMS display elements 1600 can have multiple layers made out of organic materials.

The array of EMS display elements 1600 can be manufactured on a substrate 1610. The substrate 1610 can include a semiconductor or insulating material. The substrate 1610 may be made of any number of different substrate materials, including transparent and non-transparent materials. In some implementations, the substrate 1610 may be part of an integrated circuit with one or more active or passive devices formed thereon.

In some implementations, the substrate 1610 may be flexible enough to permit a threshold amount of mechanical bending without breakage. Suitable materials for the substrate 1610 are not limited to glass and ceramics, but can also include polymers and metals. For example, the substrate 1610 can be made of a flexible polymer such as polyethylene terephthalate (PET), polyethylene naphthalate (PEN), polyimide, or a similar material. In some implementations, the substrate 1610 can have a modulus of elasticity between about 0.5 and about 5.0 GPa. Using such materials in the substrate 1610 can produce display devices having increased flexibility. Such materials in the substrate 1610 can also lend themselves to a web or roll-to-roll manufacturing process. In some implementations, the substrate 1610 may be made of a rigid material.

In some implementations, the substrate 1610 may include a thin film switching device (not shown), such as a thin film transistor (TFT). In some implementations, the thin film switching device may be disposed on the substrate 1610 so that the thin film switching device provides a base or backplane upon which subsequent layers are formed. Thus, the thin film switching device can be realized on a plastic or metal substrate 1610 that is flexible. When the thin film switching device is positioned on the substrate 1610 so that subsequent layers for the EMS display element 1600 are formed thereon, the thin film switching device may be considered to be on a rear side of the EMS display element 1600 that is opposite the viewing side of the EMS display element 1600. In some instances, this arrangement may be referred to as an "inverted" IMOD or "reverse" IMOD architecture. However, in some implementations, the thin film switching device may be substantially transparent, and so the thin film switching device may be considered to be on the viewing side of the EMS display element 1600 in such implementations. In some other implementations, the thin film switching device may be positioned over the EMS display element 1600 in a conventional IMOD architecture.

The thin film switching device may be in electrical communication with the EMS display element 1600. One or more vias 1625 may be formed on the substrate 1610 to connect the thin film switching device to electrically conductive layers in the EMS display element 1600. The EMS display element 1600 may include a bottom or stationary electrode 1620 over the vias 1625. The thin film switching device may provide a signal to the EMS display element 1600 through the via 1625 to actuate a movable electrode 1640. In some implementations, the vias 1625 may be in electrical communication with one or both of the stationary electrode 1620 and the movable electrode 1640. The thin film switching device may be between the substrate 1610 and the stationary electrode 1620.

In some implementations, a planarization layer 1615 may be disposed between the substrate 1610 and the EMS display element 1600. The planarization layer 1615 may have a substantially planar surface facing the EMS display element 1600. Vias 1625 may provide electrical interconnection between the EMS display element 1600 and the thin film switching device through the planarization layer 1615. In some implementations, such as where the thin film switching device is positioned over the EMS display element 1600, the planarization layer 1615 may be disposed between the EMS display element 1600 and the thin film switching device so that the substantially planar surface faces the thin film switching device. The planarization layer 1615 may be formed of any suitable insulating material that can be substantially planarized. For example, suitable insulating materials for the planarization layer 1615 can include a curable polymer, such as polyimide, or a spin-on dielectric material. In some implementations, the insulating material can undergo a planarization process such as lapping, grinding, chemical mechanical planarization (CMP), etching, and more. For example, the planarization layer 1615 may include an organic material that can be planarized by a resist and etch back process. In some implementations, the planarization layer 1615 can include a self-planarizing material.

The planarization layer 1615 can provide a smooth flat surface upon which the EMS display element 1600 is constructed. The EMS display element 1600 may include several different layers made of different materials. In some instances, the EMS display element 1600 may have a similar architecture as the EMS element 1500 in FIG. 15. At least two or more layers of the EMS display element 1600 may include organic materials. In some implementations, every layer in the EMS display element 1600 may be made out of or at least include an organic material, with the exception of one or more of the following: an absorber 1660, a reflective layer 1640, and a bottom electrode 1620. Hence, some structures in the EMS display element 1600 may be made out of inorganic materials, such as the absorber 1660, the reflective layer 1640, and the bottom electrode 1620.

As illustrated in the examples in FIGS. 16B and 16C, a stationary electrode or bottom electrode 1620 may be disposed over the substrate 1610 on the planarization layer 1615. The stationary electrode 1620 may include an electrically conductive material, such as a metal. For example, the stationary electrode 1620 can include aluminum. In some implementations, the stationary electrode 1620 may include or be part of an optical stack or absorber stack, as discussed earlier herein.

One or more support hinges or posts 1630 may be provided to support a movable structure having a mechanical layer 1635, a movable electrode or reflective layer 1640, and an optical layer 1645. The support hinges 1630 may be positioned over the stationary electrode 1620. The support hinges 1630 may be compressible so that the mechanical layer 1635 can move towards the stationary electrode 1620. Thus, in some implementations, the support hinges 1630 may be made of an organic material.

The organic material in the support hinges 1630 may provide elastomeric properties so that the support hinges 1630 may compress or otherwise deform in response to external forces, but return to their original shape upon removal of the external forces. In some instances, the movable structure may move towards the stationary electrode 1620 in response to the deformation of the support hinges 1630, and such movement may be different from deflection of the support hinges 1630 if the support hinges 1630 were made of an inorganic material, such as SiON.

Incorporation of an organic material in the support hinges 1630 may provide increased design flexibility in terms of mechanical properties of the support hinges 1630. Therefore, the mechanical properties of the support hinges 1630 can be tuned to a wider degree. In some implementations, the support hinges 1630 can be made of polydimethylsiloxane (PDMS) or other siloxane. Other soft organic materials can include polyurethane, parylene, SU-8, polyester, polyimide, polymethylmethacrylate (PMMA), polyethylene terephathalate (PET), polystyrene, polycarbonate, polyvinyl alcohol (PVA), polybenzimidazole, tetrafluoroethylene, and any combination of the aforementioned materials.

PDMS may offer properties that are suitable for the support hinges 1630. PDMS is elastic and can have a relatively low Young's modulus, such as between about 360 KPa and about 870 KPa. This gives PDMS the flexibility required for conformal contact, even over surface irregularities, with a relatively low probability for breakage. Furthermore, PDMS can be easily processed by molding and acquired for relatively low costs. PDMS may be patterned into structures using simple processing techniques, such as soft lithography, which does not require conventional photolithography techniques. Thus, PDMS may be patterned to support movable parts, such as the mechanical layer 1635. PDMS offers additional advantages in that it is also highly transparent, relatively hydrophobic, and curable at relatively low temperatures. Moreover, PDMS is relatively inert chemically, and is relatively compatible with inorganic and organic materials when co-processed.

PDMS may be patterned to form structures with fine features, such as support hinges 1630. One exemplary patterning process can be described in the following manner. First, a photoresist layer can be deposited over a solid substrate. Second, the photoresist can be patterned using conventional photolithography process. Third, a PDMS prepolymer solution (in the form of a viscous liquid) can be deposited over the substrate surface. Fourth, excess PDMS is removed by traversing a smooth and flat blade along the photoresist surface, leaving the remaining PDMS in between the photoresist molds. Fifth, the PDMS is thermally cured, and the photoresist is selectively removed to leave the patterned PDMS intact on the substrate surface.

The support hinges 1630 may be one or more flexible support posts. The one or more flexible support posts may provide support to a movable electrode 1640. The one or more flexible support posts may be configured to compress to permit the movable electrode 1640 to move across a gap between the movable electrode 1640 and the stationary electrode 1620. The one or more flexible support posts can return to its original shape upon release of the movable electrode 1640. The one or more flexible support posts may be made of an organic material, such as an elastomeric material. The elastomeric material can include at least one of PDMS and polyurethane. In some implementations, the one or more flexible support posts include a flexible support post attached to the movable electrode 1640 proximate a center of a surface of the movable electrode 1640.

A mechanical layer 1635 may be disposed over the support hinges 1630. The mechanical layer 1635 may provide support to the reflective layer 1640 and structural rigidity to the movable structure of the EMS display element 1600. Hence, the mechanical layer 1635 can be made out of a relatively stiff material and relatively thick. In some implementations, the mechanical layer 1635 can include a relatively stiff organic material such as polyimide, patylene, polyester, benzocyclobutene (BCB), and SU-8. For example, polyimide can have a Young's modulus greater than about 500 MPa. The stiff organic material can be photo-definable to permit patterning of the mechanical layer 1635. In some implementations, the mechanical layer 1635 can include an inorganic material, such as spin-on glass. Some types of spin-on glass can include silicate spin-on glass or organically modified spin-on glass. In some implementations, the mechanical layer 1635 can be between about 1 micron and about 10 microns. The desired thickness of the mechanical layer 1635 can depend in part on the stress profile and elastic properties of the stiff organic material.

A movable electrode or reflective layer 1640 can be disposed over the mechanical layer 1635. The reflective layer 1640 may include a material that is electrically conductive and at least partially reflective, such as aluminum or an aluminum alloy. The reflective layer 1640 may also include other reflective materials, such as silver. In some implementations, the reflective layer 1640 can be relatively thin, having a thickness between about 100 Å and about 1000 Å. In some implementations, the reflective layer 1640 can be doped to improve resistance against corrosion and mechanical fatigue. For example, the reflective layer 1640 can be doped with scandium. The amount of scandium can be between about 0.1 wt. % and about 1.0 wt. % of the reflective layer 1640.

In some implementations, an optical layer 1645 can be disposed over the reflective layer 1640. The optical layer 1645 may serve to prescribe certain optical characteristics to the EMS display element 1600 as well as provide structural rigidity to the movable structure. In some implementations, the optical layer 1645 can include an organic material. The organic material can be any suitable polymer that is at least partially transparent to visible light. Examples can include PMMA, PDMS, polycarbonate, polystyrene, SU-8, polyester, polyimide, cyclic olefin copolymer, perfluoropolyether, polyvinylchloride (PVC), polyethyleneterephthalate glycol (PETG), and any combination of the aforementioned materials. In some instances, the polymer can be electrically insulating, can have a relatively low absorption to visible light, and can be relatively stiff.

Typically, a reflective display element such as an IMOD may include a mirror stack having an optical layer 1645, where the optical layer 1645 includes multiple discrete thin film layers to control resonance peak location, dispersion properties, and bulk refractive index. These discrete thin film layers can improve a white state and color saturation in the reflective display device. For example, the optical layer 1645 can include a plurality of thin film layers, such as a high index of refraction layer, a low index of refraction layer, and an attenuator. Some or all of the thin film layers may be made out of an inorganic dielectric material.

The combination of a layer of high index material (associated with high dispersion) and a layer of low dispersion material (associated with low index) may be optimum for decreasing the separation of nulls between standing waves of different wavelengths. Hence, the color of a white state produced by the reflective display device may be improved. Furthermore, an attenuator may be capable of attenuating the energy of light corresponding to one or more wavelength ranges. For example, where an absorber is positioned in the reflective display device corresponding to the null of green wavelength field, the white-state color of the reflective display device may be tinted with green. The attenuator may be capable of attenuating a wavelength range corresponding to green colors, thereby improving the white-state color.

In the alternative or in addition to the discrete thin film layers, the optical layer 1645 may include an organic material. The optical layer 1645 with the organic material may be configured to attenuate energy of light corresponding to one or more wavelength ranges. Accordingly, the optical layer 1645 can introduce additional absorption peaks at a resonant frequency. The optical layer 1645 with the organic material may also be configured to control dispersion properties and bulk refractive index. For example, the organic material in the optical layer 1645 may have a high index of refraction (associated with high dispersion) and positioned over a material having a low index of refraction, which can improve color saturation in a reflective display device.

In some implementations, the optical layer 1645 can have a thickness between about 0.5 microns and about 100 microns. The index of refraction of the organic material as well as the thickness of the optical layer 1645 can control the optical dispersive properties of the reflective display device. In other words, the thicknesses and indices of refraction may be capable of enhancing or diminishing the reflection of a particular wavelength of light. In some implementations, the optical layer 1645 may be relatively thin, having a thickness between about 0.5 microns and about 3 microns. The optical layer 1645 may have a relatively high index of refraction, such as an index of refraction greater than an index of refraction of an adjacent layer.

In some implementations, the optical layer 1645 can include a plurality of particles 1646, where the particles 1646 have an average diameter between about 5 nm and about 500 nm. The particles 1646 can include at least one of an oxide, a fluoride, and a metal. For example, the optical layer 1645 can be loaded with a plurality of silver, gold, and/or nickel particles 1646. The optical layer 1645 may be similar to the optical layer 845 described with reference to FIGS. 8A and 8B. The choice of material, the size, and the density of the particles 1646 may tune the optical characteristics of the optical layer 1645, including the resonant frequency of absorption and the amount of absorption.

A gap (not shown) may be defined between the mechanical layer 1635 and the stationary electrode 1620 in the EMS display element 1600. The gap may be similar to the gap 1550*a* of the EMS element 1500 in FIG. 15. The movable electrode or reflective layer 1640 may be configured to move across the gap toward the stationary electrode 1620 by electrostatic actuation. The gap may serve as an optically resonant cavity between an absorber 1660 and the reflective layer 1640. The distance across the gap between the reflective layer 1640 and the stationary electrode 1620 may correspond to different visible wavelengths in the display. The size of the gap can correspond to a reflectance spectrum for the EMS display element 1600 so as to produce certain colors. As described earlier with respect to FIGS. 7A-7E, the white state may be tinted with green. However, depending on the architecture of the EMS display element 1600, the white state may be tinted with another color. The optical layer 1645 may include particles 1646 to introduce one or more resonant absorption peaks that attenuate such colors. Thus, the optical layer 1645 can improve the white state and color saturation. In some implementations, the particles 1646 may be configured to attenuate a wavelength range corresponding to green colors.

Typically, the gap can be filled with air in the EMS display element 1600. In some implementations, the gap can be substantially filled with a liquid instead of air. Substantially filling the gap can refer to filling more than 70%, more than 80%, or more than 90% of the gap. The liquid may be substantially transparent to light, where substantial transparency can refer to transmittance of visible light of about 70% or more, such as about 80% or more or about 90% or more. The liquid may also have a relatively low viscosity. Examples of substantially transparent and relatively low viscosity liquid can include glycerols or other related liquids used in anti-freeze applications. The liquid can include additives to minimize effects of corrosion on surrounding materials. Other examples of appropriate liquids for substantially filling the gap can include de-ionized water, methanol, ethanol and other alcohols, paraffins, olefins, ethers, silicone oils, fluorinated silicone oils, or other natural or synthetic solvents or lubricants. A person of ordinary skill in the art will readily understand that holes, gaps, openings, or voids may still be present when the liquid substantially fills the gaps. The use of a liquid can reduce the actuation distance between the movable structure and the stationary electrode 1620. As a result, the voltage required to move the movable structure can be reduced.

It will be readily understood that the optical layer 1645 need not be disposed directly on the reflective layer 1640 as illustrated in the examples in FIGS. 16B and 16C. In some implementations, one or more dielectric layers may be positioned between the optical layer 1645 and the reflective layer 1640. The one or more dielectric layers may serve as impedance-matching layers. In some implementations, the optical layer 1645 may be included with or formed on the protective layer 1670. In some implementations, the optical layer 1645 may be positioned between the stationary electrode 1620 and the reflective layer 1640. Moreover, the absorber 1660 need not be disposed directly under the protective layer 1670 as illustrated in the examples in FIGS. 16B and 16C. For example, the absorber 1660 may be part of or positioned over the stationary electrode 1620.

The EMS display element 1600 can further include a shell or protective layer 1670 that can provide protection against environmental agents and external forces, as well as provide mechanical support for any subsequent layers formed thereon. The protective layer 1670 can be relatively thick and on the order of tens and even hundreds of microns. For example, the protective layer 1670 can be between about 10 microns and 100 microns. In some implementations, the protective layer 1670 can include holes, such as release holes, to permit ingress of etchants for removal of sacrificial layers. Supports 1605, which may be shaped as pillars, may provide support to the protective layer 1670.

The protective layer 1670 can include an organic material. The organic material can be a relatively stiff polymer that is at least partially transparent to visible light. For example, the protective layer 1670 can be a substantially transparent polymer superstrate. The protective layer 1670 can have an index of refraction that can closely match typical clear adhesives and a cover glass. For example, the index of refraction can be between about 1.45 and about 1.55, or such as between about 1.48 and about 1.51. The protective layer 1670 can be made of an acrylic, such as PMMA.

The EMS display element 1600 may include an absorber 1660. In some implementations, the absorber may be positioned over the reflective layer 1640 and spaced apart from the reflective layer 1640. Such a configuration can be implemented in a reverse IMOD architecture. In some implementations, the absorber 1660 may be positioned between the substrate 1610 and the reflective layer 1640. Such a configuration can be implemented in a conventional IMOD architecture where the substrate 1610 faces the viewing side of a display device.

An absorber 1660 can be positioned below the protective layer 1670 so that it is between the protective layer 1670 and the optical layer 1645. In some implementations, the protective layer 1670 can provide mechanical support for the absorber 1660. The absorber 1660 can be made of material that can at least partially absorb visible light. In some implementations, the absorber 1660 can include an optical or absorber stack to enhance its performance.

In some implementations, a passivation layer (not shown) may be positioned below the absorber 1660 so that it is between the absorber 1660 and the optical layer 1645. The passivation layer may be made of a dielectric material that can serve one of many functions, including serving as a moisture barrier and as an anti-reflective coating.

In some implementations, the protective layer 1670 may serve as a light guide for distributing and directing light to the EMS display element 1600. In some implementations, indentations may be made along a surface of the protective layer 1670 to form light-turning features or other optical features. In some implementations, such light-turning features or other optical features may be imprinted along a surface of the protective layer 1670. The light-turning features may be configured to redirect light, to propagate light within the light guide, or to propagate light out of the light guide. The redirected light may be applied to illuminate a display in some implementations. Examples of light-turning features include facets, refractive features, diffractive features, diffusive features, printed dots, and combinations thereof. In some implementations, the optical features can include waveguides or optical fibers for color control. The waveguides or optical fibers can serve as three-dimensional interferometric arrays that provide interference from all angles. The waveguides can channel incident light of certain wavelengths to appropriately colored pixels, or change light of a certain incident angle to a new incident angle, or a combination of both. Thus, incident light of any angle does not change a spectral pattern. The waveguides can be designed as pillars. In some implementations, the waveguides can have a height between about 1 micron and about 5 microns, and a diameter between about 0.5 microns and about 1 micron.

The aforementioned EMS display element 1600 can be part of an EMS apparatus with a substrate 1610, a stationary electrode 1620 over the substrate 1610, and a movable electrode 1640 over the stationary electrode 1620 with a gap therebetween. The movable electrode 1640 can include a reflective layer. One or more organic layers may be formed over the substrate 1610, with some of the one or more organic layers between the movable electrode 1640 and the stationary electrode 1620. Furthermore, some of the one or more organic layers may be part of an optical layer 1645 configured to attenuate energy of light corresponding to one or more wavelength ranges. In some implementations, the one or more organic layers can be made of photopolymers. A photopolymer may be a polymer that can change its properties upon exposure to light, such as ultraviolet (UV) light. The photopolymer may be selectively exposed and patterned to form polymer structures in the EMS display element 1600. Examples of photopolymers can include but are not limited to polydimethylglutarimide (PMGI) and SU-8. In some implementations, one or more sacrificial layers can be made of a photopolymer.

In some implementations, the one or more organic layers can refer to any structure in the EMS display element 1600 that is made of a polymer material. For example, a layer can constitute an organic layer where more than 50% of the material is an organic material, such as a polymer material. The one or more organic layers may form mechanical and/or optical structures in the EMS display element 1600. Depending on the structure being formed in the EMS display element 1600, the choice of polymer material may vary. For structures having elastomeric properties, such as a support hinge 1630, the polymer material can include an elastomer such as PDMS and polyurethane. For structures having optical properties, such as an optical layer 1645, the polymer material can be PMMA, PDMS, polycarbonate, polystyrene, SU-8, polyester, polyimide, cyclic olefin copolymer, perfluoropolyether, PVC, PETG, and combinations thereof. For structures having mechanically rigid properties, such as a mechanical layer 1635, the polymer material can be a stiff polymer such as polyimide, polyester, parylene, BCB, and SU-8. In some implementations, the stiff polymer can have a Young's modulus greater than about 500 MPa.

The one or more organic layers between the movable electrode 1640 and the stationary electrode 1620 can include one or both of a mechanical layer 1635 and a support hinge 1630 in the EMS display element 1600. In some implementations, the one or more organic layers part of the optical layer 1645 may be between the movable electrode 1640 and an absorber 1660. For example, the one or more organic layers part of the optical layer 1645 may be disposed on the movable electrode 1640 and below the absorber 1660. In some implementations, the one or more organic layers part of the optical layer 1645 may be loaded with particles 1646. In some implementations, the EMS apparatus 1600 can further include a protective layer 1670 that constitutes a substantially transparent polymer superstrate over the movable electrode 1640.

Figure 17:
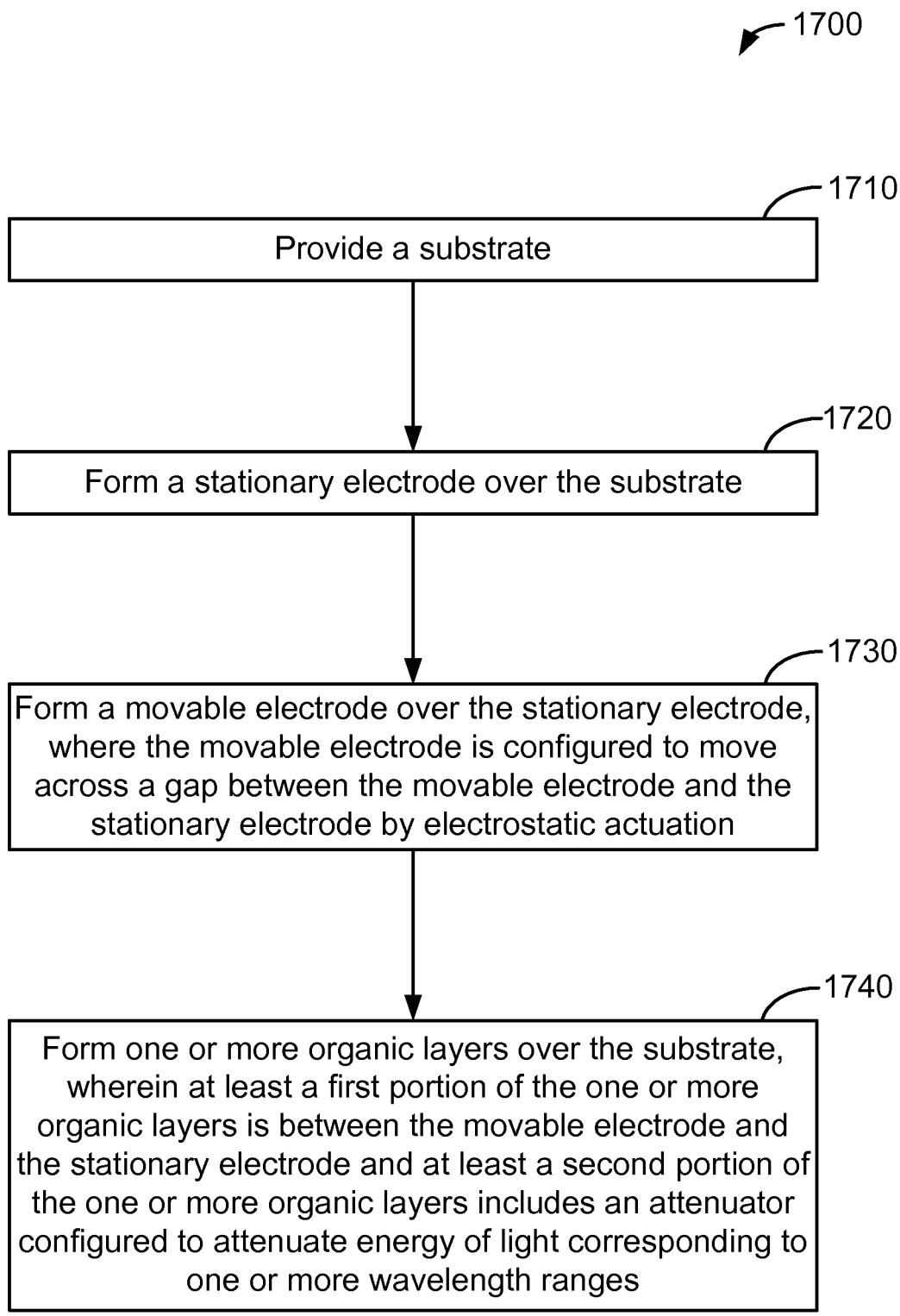
FIG. 17 shows a flow diagram illustrating an example method of manufacturing an EMS apparatus.

FIG. 17 shows a flow diagram illustrating an example method of manufacturing an EMS apparatus. A person having ordinary skill in the art will readily understand that additional stages not shown in FIG. 17 may also be present. For example, it will be readily understood that additional processes of depositing underlying or overlying layers, such as sacrificial layers, planarization layers, black mask layers, bussing layers, etc., may be present. Some implementations may perform the steps in different orders and/or with different, fewer, or additional steps than the ones shown in FIG. 17.

At block 1710 of a process 1700, a substrate is provided. The substrate can include any number of different substrate materials. Where reflected light does not pass through the substrate to reach a viewer, the substrate can include opaque and translucent materials, as well as transparent materials. In some implementations, the substrate can include a flexible plastic or metal foil with sufficient flexibility for web or roll-to-roll processing. Electronic circuitry such as sensors, transistors, resistors, and capacitors can be formed on the substrate. For example, the substrate can be a flexible substrate upon which a TFT can be formed.

Over the substrate and the TFT on which the substrate is formed, one or more layers of the EMS apparatus may be formed of organic materials. The one or more organic layers may be fabricated using additive processing techniques instead of conventional semiconductor fabrication techniques, such as photolithography. Additive processing techniques for the one or more organic layers can include printing, casting and molding, embossing, lamination, spin-coating, low temperature CVD, spraying, screen-printing, thick film processing, soft lithography, nano-imprinting, etc. Such fabrication techniques can increase efficiency and reduce costs in manufacturing MEMS and EMS devices.

At block 1720 of the process 1700, a stationary electrode is formed over the substrate. The stationary electrode can be deposited using any appropriate deposition techniques, such as PVD, CVD, PECVD, ALD, spin-coating, etc. For example, aluminum may be sputtered onto the substrate and subsequently patterned and etched. In some implementations, the stationary electrode can be deposited and patterned using an additive processing technique. For example, a metal layer in the stationary electrode can be deposited by plating, inkjet printing, or screen printing. By way of an example, the metal may be deposited by providing molten metal or conductive ink at precise locations using an inkjet printer, and subsequently cooled. The metal may be electrically connected to conductive routings or traces. In some implementations, the metal may be electrically connected to conductive vias extending through the substrate or a planarization layer between the stationary electrode and the substrate.

In some implementations, the process 1700 can further include depositing a first sacrificial layer over the stationary electrode. The sacrificial layer can be made of a material that can be patterned and developed using an orthogonal solvent. An orthogonal solvent may be configured to not deteriorate organic layers. Examples of orthogonal solvents include supercritical carbon dioxide and fluorinated ethers. In some implementations, the first sacrificial layer can be made of a fluorinated photoresist, and the fluorinated photoresist can be patterned and developed using the orthogonal solvent.

The orthogonal solvent can be configured to remove the first sacrificial layer, and also configured to not deteriorate or otherwise adversely affect surrounding organic materials. In other words, the orthogonal solvent may effectively remove fluorinated photoresist while avoiding any substantial interaction with surrounding organic layers. For example, the surrounding organic layers can include PDMS, photopolymers, and other organic materials that are not susceptible to deterioration by the orthogonal solvent. The first sacrificial layer can be patterned to include one or more holes where the support hinges or support posts can be formed. In some implementations, the first sacrificial layer can have a thickness defining the size of the air gap of the EMS apparatus.

At block 1730 of the process 1700, a movable electrode may be formed over the stationary electrode, where the movable electrode is configured to move across a gap between the movable electrode and the stationary electrode by electrostatic actuation. At block 1740 of the process 1700, one or more organic layers may be formed over the substrate, where at least a first portion of the one or more organic layers is between the movable electrode and the stationary electrode and at least a second portion of the one or more organic layers are part of an optical layer configured to attenuate energy of light corresponding to one or more wavelength ranges. It will be readily understood that in the process 1700, the one or more organic layers may be formed prior to and/or subsequent to the formation of the movable electrode over the stationary electrode.

After the first sacrificial layer is deposited and patterned, a first organic material such as PDMS may be deposited to substantially fill the holes in the first sacrificial layer. Substantially filling the holes can refer to filling more than 70%, more than 80%, or more than 90% of the holes. A person of ordinary skill in the art will readily understand that smaller-sized holes, gaps, openings, or voids may still be present when the first organic material substantially fills the holes. The first organic material may define the support hinges or support posts of the EMS apparatus. The first organic material may be deposited using any appropriate additive processing technique described above. For example, the first organic material may be poured as a viscous liquid to substantially fill the holes in the sacrificial material, and excess material may be scraped off using a smooth blade or squeegee. The first organic material can be subsequently cured. The first organic material may be cured at a temperature of less than about 100° C. In some implementations, the first organic material can be conditioned to ensure effective adhesion of subsequently deposited layers on top of it. For example, the first organic material defining the support hinges or support posts of the EMS apparatus can be treated using a plasma surface treatment.

In some implementations, a second organic material may be deposited over the first organic material and the first sacrificial layer. The second organic material may define the mechanical layer of the EMS apparatus. The second organic material may be deposited using any appropriate deposition technique, including any appropriate additive processing technique described above. The second organic material may include a stiff polymer material, such as polyimide, parylene, polyester, BCB, and SU-8. In some implementations, deposition of the second organic material may form a mechanical layer that is relatively thick, where a thickness can be between about 1 micron and about 10 microns. The second organic material may be connected to or part of the movable electrode.

In some implementations, the movable electrode can include a metallic reflective material, such as aluminum, silver, and alloys thereof. In some implementations, the metallic reflective material may be doped with impurities that improve resistance against corrosion and mechanical fatigue. The metallic reflective material may define a reflective layer or mirror layer of the EMS apparatus. The metallic reflective material may be deposited over the second organic material using any appropriate deposition technique. In some implementations, the metallic reflective material may be deposited using an appropriate additive processing technique described above.

Depending on the architecture of the EMS apparatus, the optical layer may be formed above or below the reflective layer of the EMS apparatus. The optical layer may be made of a third organic material, where the third organic material may be combined with a plurality of particles in the optical layer. In other words, the third organic material may form a backbone or host material of the optical layer, and the particles may be provided in the third organic material. The plurality of particles may have an average diameter between about 5 nm and about 500 nm. The plurality of particles may control at least some of the optical characteristics of the EMS apparatus. Specifically, the plurality of particles may at least partially absorb visible light and introduce absorption peaks at certain wavelength ranges. Moreover, the plurality of particles may be configured to attenuate energy of light in one or more wavelength ranges.

In implementations where the optical layer is formed above the reflective layer of the EMS apparatus, the third organic material may be deposited over the metallic reflective material. The third organic material may be deposited using any appropriate deposition technique, including an appropriate additive processing technique described above. In some implementations, the third organic material may include a polymer that is substantially transparent to visible light, electrically insulating, and relatively stiff. For example, the third organic material can include PMMA, PDMS, polycarbonate, polystyrene, SU-8, polyester, polyimide, cyclic olefin copolymer, perfluoropolyether, PVC, PETG, and any combination of the aforementioned materials. In some implementations, deposition of the third organic material may form at least part of the optical layer, where a thickness of the optical layer can be between about 0.5 microns and about 100 microns. The optical layer may further include impedance-matching layers to enhance or diminish reflection of one or more colors, where the impedance-matching layers can include a high index of refraction layer coupled with a low index of refraction layer. The optical layer may be similar to the optical layer 845 described with reference to FIGS. 8A and 8B.

In some implementations, a second sacrificial layer may be deposited over the third organic material defining the optical layer. In some implementations, the second sacrificial layer may be deposited over the optical layer so that the optical layer is separated from the reflective layer by the second sacrificial layer. The second sacrificial layer may be formed of a material, such as a fluorinated photoresist, that can be removed by an orthogonal solvent, such as a fluorinated ether. Removal of the first and second sacrificial layers forms gaps to release the EMS apparatus. The gaps may be similar to gaps 1550a and 1550b described with reference to FIG. 15.

In some implementations, the process 1700 further includes forming an absorber over the movable electrode. In some implementations, the absorber may be formed over the optical layer and/or over the second sacrificial layer. The absorber may be deposited using any appropriate deposition technique. In some implementations, the absorber may be connected to a shell or protective layer. The protective layer may be formed by depositing a fourth organic material over the absorber using any appropriate deposition technique. The fourth organic material can include a substantially transparent polymer, such as an acrylic. The fourth organic material can define a superstrate of the EMS apparatus with an index of refraction that can closely match typical clear adhesives and a cover glass. For example, the index of refraction can be between about 1.45 and about 1.55, such as between about 1.48 and about 1.51. In some implementations, one or more release holes can be formed (e.g., patterned) in any of the one or more organic layers to permit entry of the orthogonal solvent to remove the first and/or second sacrificial layers. For example, the fourth organic material defining the superstrate can include the one or more release holes. In some implementations, some of the one or more release holes may vertically extend through the superstrate, and some of the one or more release holes may laterally extend through any of the one or more organic layers. In some implementations, the process 1700 can further include removing one or both of the first and second sacrificial layers using the orthogonal solvent. The one or more release holes may be covered (e.g., plugged) after removing one or both of the first and second sacrificial layers. In some implementations, the one or more release holes may be covered by lamination.

Figure 18A:
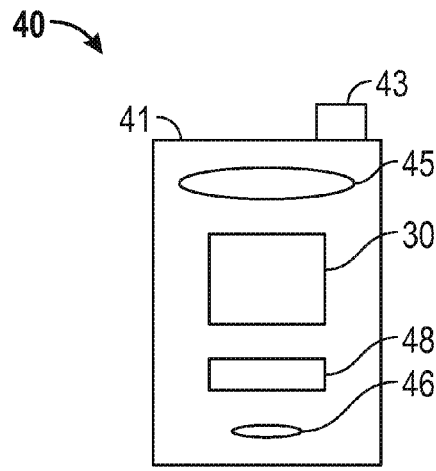
FIGS. 18A and 18B are system block diagrams illustrating a display device that includes a plurality of IMOD display elements.
Figure 18B:
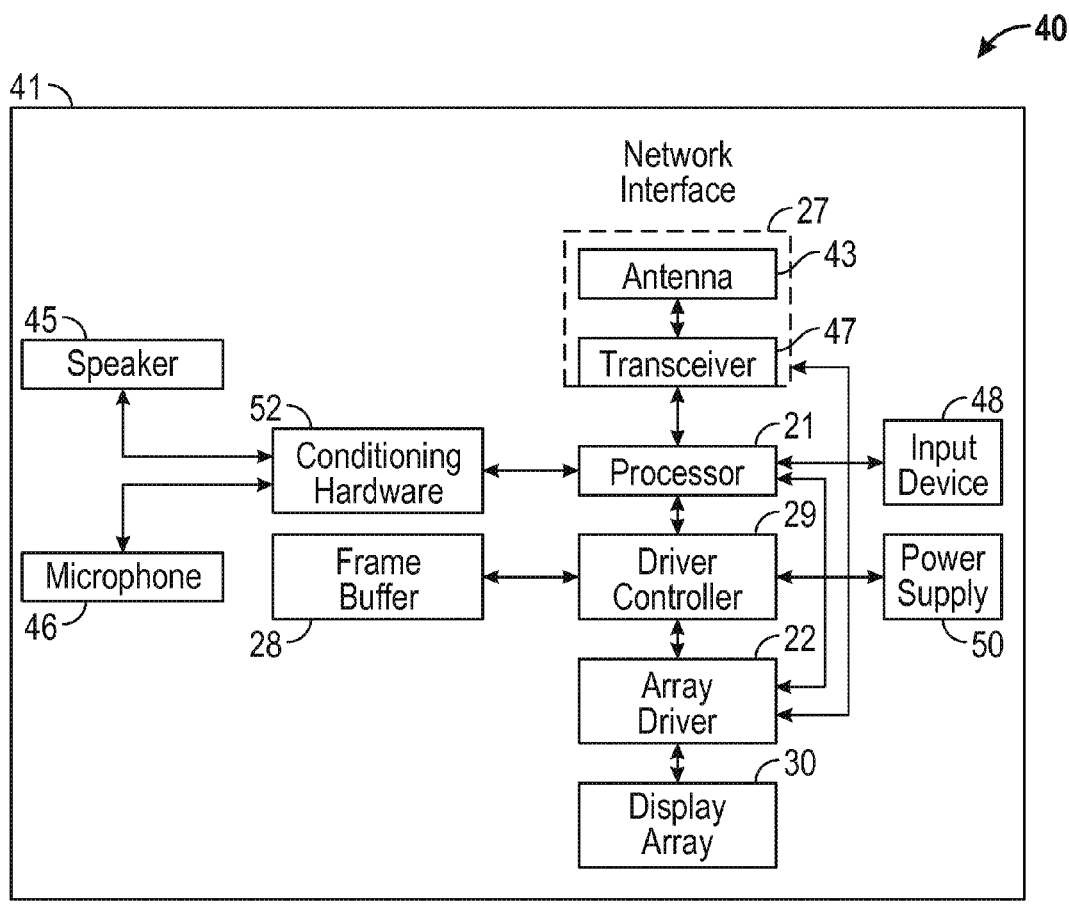

FIGS. 18A and 18B are system block diagrams illustrating a display device 40 that includes a plurality of IMOD display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display, as described herein.

The components of the display device 40 are schematically illustrated in FIG. 18A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 18A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electromechanical systems apparatus comprising:
a substrate;
a stationary electrode over the substrate;
one or more flexible support posts over the substrate; and
a movable electrode over the stationary electrode and supported by the one or more flexible support posts, the movable electrode configured to move across a gap between the movable electrode and stationary electrode upon electrostatic actuation, the one or more flexible support posts including a first organic material and configured to compress to permit the movable electrode to move across the gap, wherein the one or more flexible support posts are made of an elastomeric material, wherein the movable electrode includes a mechanical layer and a reflective layer, the reflective layer supported on the mechanical layer.

2. The apparatus of claim 1, wherein the mechanical layer includes a second organic material.

3. The apparatus of claim 1, further comprising an optical layer including a second organic material over the substrate, the optical layer configured to attenuate energy of light corresponding to one or more wavelength ranges.

4. The apparatus of claim 3, wherein the optical layer includes a plurality of particles, the particles having an average diameter between about 5 nm and about 500 nm.

5. The apparatus of claim 1, wherein the mechanical layer is made of a rigid material.

6. The apparatus of claim 1, wherein the elastomeric material includes at least one of polydimethylsiloxane (PDMS) and polyurethane.

7. The apparatus of claim 1, wherein the substrate is made of a flexible material.

8. The apparatus of claim 1, wherein the substrate is made of a rigid material.

9. The apparatus of claim 1, wherein the one or more flexible support posts include a flexible support post attached to the movable electrode proximate a center of a surface of the movable electrode.

10. The apparatus of claim 1, wherein the apparatus forms a display, the display comprising:
an interferometric modulator (IMOD) formed on the substrate, the IMOD including:
the stationary electrode;
the movable electrode, the movable electrode including a reflective layer;
the one or more flexible support posts; and
an absorber over the movable electrode and spaced apart from the reflective layer.

11. The apparatus of claim 10, wherein a distance across the gap between the movable electrode and stationary electrode corresponds to different visible wavelengths for the IMOD in the display.

12. The apparatus of claim 10, further comprising a substantially transparent polymer superstrate over the absorber.

13. The apparatus of claim 1, wherein the apparatus forms a display, the display comprising:
a processor that is configured to communicate with the display, the processor being configured to process image data; and
a memory device that is configured to communicate with the processor.

14. The apparatus of claim 13, further comprising:
a driver circuit configured to send at least one signal to the display; and
a controller configured to send at least a portion of the image data to the driver circuit.

15. The apparatus of claim 13, further comprising:
an image source module configured to send the image data to the processor, wherein the image source module comprises at least one of a receiver, transceiver, and transmitter.

16. The apparatus of claim 13, further comprising:
an input device configured to receive input data and to communicate the input data to the processor.

17. A method of manufacturing an electromechanical systems apparatus, the method comprising:
providing a substrate;
forming a stationary electrode over the substrate;
forming one or more flexible support posts over the substrate; and
forming a movable electrode over the stationary electrode and supported by the one or more flexible support posts, the movable electrode configured to move across a gap between the movable electrode and the stationary electrode by electrostatic actuation, the one or more flexible support posts including a first organic material and configured to permit the movable electrode to move across the gap, wherein the one or more flexible support posts are made of an elastomeric material, wherein the movable electrode includes a mechanical layer and a reflective layer, the reflective layer supported on the mechanical layer.

18. The method of claim 17, wherein the mechanical layer includes a second organic material.

19. The method of claim 17, wherein the elastomeric material includes at least one of polydimethylsiloxane (PDMS) and polyurethane.

20. The method of claim 17, wherein forming the one or more flexible support posts comprises:
depositing a photoresist layer over the substrate;
patterning the photoresist layer to expose a portion of the substrate;
depositing a solution of the first organic material over the exposed portion of the substrate; and
curing the first organic material to solidify the first organic material.

21. The method of claim 17, further comprising:
forming an optical layer including a second organic material over the substrate, the optical layer configured to attenuate energy of light corresponding to one or more wavelength ranges.

* * * * *